(12) United States Patent     (10) Patent No.: US 8,775,940 B2
Beringer et al.     (45) Date of Patent: Jul. 8, 2014

(54) SITUATIONAL WORKSPACES

(75) Inventors: Joerg Beringer, Los Altos, CA (US); Frederic E. Samson, San Francisco, CA (US)

(73) Assignee: SAP AG, Walldorf (DE)

( * ) Notice: Subject to any disclaimer, the term of this patent is extended or adjusted under 35 U.S.C. 154(b) by 393 days.

(21) Appl. No.: 12/428,463

(22) Filed: Apr. 22, 2009

(65) Prior Publication Data

US 2009/0265634 A1     Oct. 22, 2009

Related U.S. Application Data

(60) Provisional application No. 61/047,069, filed on Apr. 22, 2008.

(51) Int. Cl.
*G06F 3/048* (2013.01)

(52) U.S. Cl.
USPC .......................................................... 715/733

(58) Field of Classification Search
USPC .......................................................... 715/733
See application file for complete search history.

(56) References Cited

U.S. PATENT DOCUMENTS

| | | | |
|---|---|---|---|
| 7,296,056 B2 * | 11/2007 | Yaung | 709/205 |
| 2004/0122696 A1 * | 6/2004 | Beringer | 705/1 |
| 2006/0053380 A1 * | 3/2006 | Spataro et al. | 715/753 |
| 2006/0106872 A1 * | 5/2006 | Leban et al. | 707/104.1 |
| 2007/0118844 A1 | 5/2007 | Huang et al. | |
| 2007/0124374 A1 * | 5/2007 | Arun et al. | 709/204 |
| 2007/0265895 A1 | 11/2007 | Moore | |
| 2008/0109283 A1 | 5/2008 | Binnie et al. | |
| 2009/0144627 A1 * | 6/2009 | O'Sullivan et al. | 715/733 |
| 2009/0192845 A1 * | 7/2009 | Gudipaty et al. | 705/7 |
| 2009/0254406 A1 * | 10/2009 | Sichart et al. | 705/9 |
| 2009/0307598 A1 * | 12/2009 | Giles | 715/738 |
| 2009/0307604 A1 * | 12/2009 | Giles et al. | 715/751 |
| 2009/0307605 A1 * | 12/2009 | Ryan et al. | 715/751 |
| 2009/0320035 A1 * | 12/2009 | Ahlgren et al. | 718/104 |

OTHER PUBLICATIONS

Pankratius, Victor, et al., "A Formal Foundation for Workflow Composition, Workflow View Definition, and Workflow Normalization based on Petri Nets", *Proceedings of the 2nd Asia-Pacific conference on Conceptual modelling*—vol. 43, Newcastle, New South Wales, (2005), 79-88.

* cited by examiner

*Primary Examiner* — William Bashore
*Assistant Examiner* — Hien Duong
(74) *Attorney, Agent, or Firm* — Blakely, Sokoloff, Taylor & Zafman, LLP

(57) ABSTRACT

A workspace container provides data content in a generic way with interfaces and tools common to data of different types. The container has an owner, and may include one or more activities, which each have an objective and are associated with various resources to accomplish the objective. User interaction in the container transforms the container contents and is persisted with the container. Different data types are represented uniformly from the perspective of data input, data access, and display rendering. Additionally, common tools can be embedded within the container, which receive content items and user-generated content as input to transform the container contents at a runtime of the container. The container may also be collaborative, with multiple users having access to the data content simultaneously (except for actual content collisions). The container may be exposed to another user through request-to-perform techniques as passed through a work package.

23 Claims, 18 Drawing Sheets

SITUATIONAL WORKSPACES

RELATED APPLICATIONS

This application is based on provisional application 61/047,069 filed Apr. 22, 2008, and claims the benefit of priority of that provisional application. Furthermore, the provisional application is hereby incorporated by reference.

FIELD

Embodiments of the invention are related generally to data access in computer systems, and embodiments of the invention are more particularly related to collaborative workspaces that provide work orchestration and collaborative, interactive user interfaces.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2008, SAP AG, All Rights Reserved.

BACKGROUND

The organizing and performing work for a single user on a computer system is widely implemented. Generally, software tools are created to allow a single user to perform tasks and generate content within specific applications. The context of one application typically does not lend perfectly to the content of another application. The ability to perform a long-running process that cuts across multiple applications is generally limited to the user performing ad hoc processes and interacting with multiple applications in sequence. Similar limitations exist on collaboration for performing such work or accomplishing particular objectives.

Both collaboration and individual work on goal-oriented tasks that involve resources of different data types and/or resources sourced from different applications, today generally require separate development by individual users followed by manual integration of content. Users can create "To Do" lists, post calendars, and generate content, but none of the current offerings allow the leveraging of server system (e.g., enterprise system) resources to accomplish the objective in the way that might be provided for business processes, for example. Some collaboration is computer-assisted, such as through the use of editing tools, but typically requires the sending of original copies of documents back and forth for the integration phase.

The advent of social network is trying to connect people in computer system and virtual spaces in a similar way that people are accustomed to interacting in the real world. However, the usefulness of social networking is typically communicative, rather than having any focus or functionality from the perspective of getting work done. Social networks allow interaction and contribution by means of a hosted software solution. Current drawbacks of the so-called "Web 2.0" that incorporates the concepts of social networking include the fact that the systems currently in place are not well suited for corporate knowledge management, such as communities of best practice sharing their work practices, user communities sharing their knowledge about an internal tool, and communities of interest collectively contributing to a topic. While such interactions may be accomplished in an informal, communicative way with current social networking, such interactions do not integrate into the enterprise, or allow management, access, and monitoring by the enterprise systems.

The concepts of "Web 2.0" also include the paradigm of a world of users that share self-published content over the Internet. Thus, an everyday user turns into an active content publisher by using simplified versions of web publishing tools to create their own web content, e.g., Facebook photo albums or Wiki pages. While such a paradigm appears to leverage the power of the entire human population to externalize and manifest knowledge to be accessed and consumed by others, mere publishing has resulted in an explosion of content that is not necessarily accessible and usable, especially in accomplishing work within an enterprise. The tools are not in place to leverage the generation of content to get work done.

Task management is a well known concept in various software products spanning from core ERP (enterprise resource planning) to modern personal productivity tools. However, similar to the current limits of social interaction systems as described above, current products fall short in supporting the actual work practice of users, whether alone or in groups. For example, in personal productivity tools (e.g., word processing, spreadsheets, etc.) the concept of tasks is limited to the simplified concept of a text descriptor and properties like owner, due date, and importance. The task object is not meant to include the actual work but is simply a reminder or meta object to plan work. Consequently, the actual work is done disconnected from any system support. Furthermore, coordination of the work among others is difficult or impossible to achieve and even more difficult to monitor within the system.

Currently there exist collaboration tools, which rely on the principle of sharing information. However, such tools are historically disconnected from productivity tools and ERP software applications. The result is that collaboration tools are limited in scope of functionality to publishing content in a way that it can be coordinated by user action. However, again, the actual coordination of contents and/or people, and work are separate contexts. Synchronous sharing of information is typically limited to a few specialized products, mostly application sharing or virtual meeting tools. Asynchronous sharing tools like collaboration rooms (e.g., GROOVE) or shared info site (e.g., SHAREPOINT) are until today stand-alone tools and not extensions of the origin of collaboration. Users only make use of them for collaboration with poor integration of their personal task context. It will be understood that all trademarks used herein are the sole property of their respective owners, and are used herein only for purposes of identification.

ERP workflow tasks come with business information and simple response or data entry options. In most cases, users collaborate and process information outside of the workflow system and act beyond any modeled processes. Thus, most of the actual work practice is hidden and unmanaged, and cannot leverage the tools of the ERP system. Workflow is typically modeled as flow or state transitions and assumes that the system has sufficient knowledge to compute the state transitions. Systems attempting to control flow fall short when trying to support unstructured information work in complex business situations, which by definition involve problems and tasks understood by the users but not by the system.

Besides the lack of supporting the actual work, none of the above task management solutions provide sufficient support for people-centric work orchestration. ERP workflow is mediated by the system and pushes tasks to users without taking into consideration how people request work from each other in real life. Requesting work typically involves speech-acts like request, accept, promise, clarify, request, or declare between the person who is asking for work (requester), and the person who is committing to work (performer). Traditional workflow design typically ignores this human-to-human relationship and reduces it to rudimentary concepts like task ownership and simple delegation as part of task management.

Between system-enforced orchestration and personal task management, there is a wide gap of true collective collaboration, in which people work together on the same artifacts or the same context.

Due to the effort of setting up and administrating such workspaces, such spaces have been used for either departmental information spaces or for collaborative project work with critical importance and long lifetime. Newer, more flexible tools, such as hosted spaces like Google Groups allow quicker creation and simpler content authoring. However, such spaces do not integrate into business process management or consume or integrate business content, and so they fail to be enterprise ready. None of the current systems provides a useful environment for a single user to perform work that may or may not be shared with others.

Furthermore, the principle of authoring content and collaborating to generate content is currently focused on the assembling of web pages. Typical methods involve users selecting from a repository of available UI (user interface) parts, which they then lay out in the page in a way that makes sense for them. Consequently, the authoring depends on the existence of such UI parts and the suitability for re-use of such parts. Such an approach raises serious scalability issues and questions the ability to support information work which is not predictable. In general, current tools lack integration of business content, and raise security concerns, both of which limit current applicability to unstructured content, rather than structured business content.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
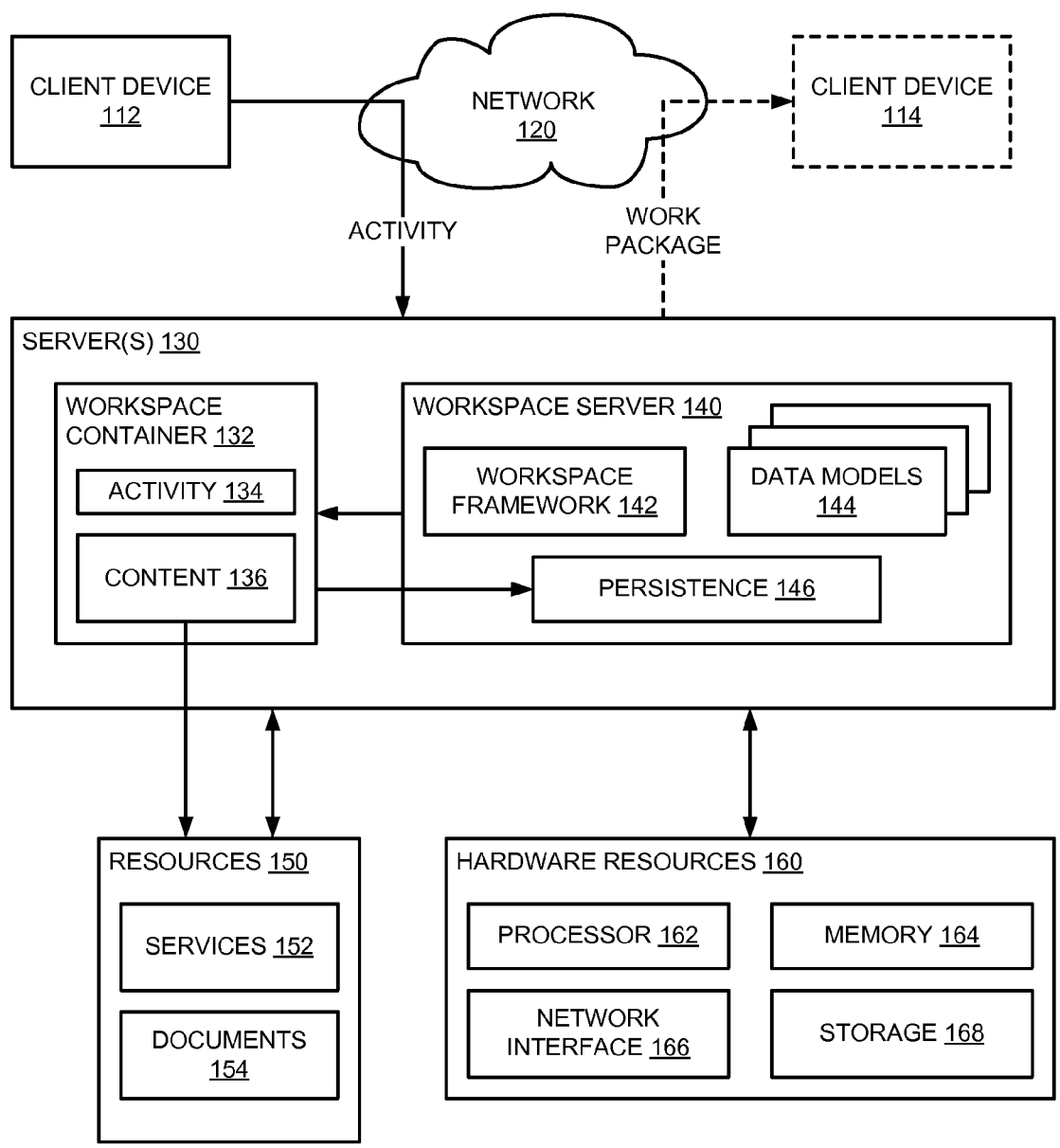
FIG. 1 is a block diagram of an embodiment of a system that generates a workspace container for performing work related to a user activity.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, a server generates a container for an activity and provisions the container with content, interfaces, and tools or methods to work toward an objective of the activity. The container is associated with one or more users, one of which is a user-owner. A container allows users to accomplish work through the container as an interface. The container can thus be a transformative user interface (UI) to accomplish the activity. The container is transformative in that user interaction with resources that are part of the container change state of the data contents of the container, and are persisted. Both modified data resources as well as user input can be persisted.

The resources within the container can be elements or items that are of differing data types, and may not necessarily be all common to a particular application. Thus, the data types and the sources of the content items of the container may be different. However, all content items are represented uniformly within the container. Data input, data access, and display rendering is common across content items, regardless of data type or source of the underlying data or data objects/business objects that the content items point to in the server. The resources can thus be received as inputs and wrapped with interfaces to provide a common user interaction with all resources within the container. Additionally, common tools can be embedded within the container, which receive content items and user-generated content as input to transform the container contents at a runtime of the container. The tools can be said to consume the content items as inputs or consume content items as work artifacts, providing methods that can be executed on the content items. One or more users, through the interfaces and tools can use data, compose data, move data around, combine data, etc.

In one embodiment, the container is collaborative, with multiple users having access to the data content simultaneously (except for actual content collisions). The container may be exposed to another user through request-to-perform techniques as passed through a work package. The sharing and joint work within the container make it more effective at providing a common work space than current social networking systems. One frontend device may make a request of another frontend device. The request is passed from the requester device to the receiver device through the server as a work package. The work package represents the request by the requester for the receiver to accomplish the activity. The work package and its associated request may be for an entire activity that the requester owns (at least until the receiver accepts, at which time the requester can own the activity), or it may be for a sub-part of the activity, or an activity in support of an activity of the requester.

When the receiver accepts the request, the server instantiates a container instance or a workspace container, in which the server presents the associated resources and access to data and services needed to perform the objective of the requested activity. Containers have an associated context, which is persisted in the server level, and not at the frontend devices.

In implementations within enterprise systems, the instantiating the container and the provisioning the resources and access for the container leverage the system resources for users in accomplishing work. Such an approach is in contrast to ad hoc and non-monitored/managed actions (e.g., an atomic unit of work, or one or more operations to perform in furtherance of the objective of the activity) as has previously been done. As described, the system can monitor the performance of the activity, which no longer needs to be "off the grid" or not visible from within the system management. In one embodiment, the performance of actions within the container can affect the server, such as by initiating a state change of a business process based on work performed within the container. Rather than the system waiting for a user to indicate the state change should take place because an action has been performed, the system will be aware of the work performed within the container.

In one embodiment, an activity is provisioned for a work situation within a container, where the container is associated with a defined set of states for the activity that allows state flow through user interaction, a visualization for recording state of the activity, and the context including the persisted state. The activity may be any type of long-running operation to be performed by a user, and may or may not be related to a business process or an enterprise or ERP system. In an implementation where the activity is related to an enterprise system, the activity may be part of a phase of a business process, which would include parameters identifying resources to perform the business process, and defining deliverables or outcomes expected of the business process and its phases. The activity can be defined and provisioned in accordance with such business process definitions. As mentioned above, the current state of the business process can be modified by the system in response to user interaction within the container.

In one embodiment, the activity includes one or more subactivities, where each sub-activity is an atomic unit of work that is represented by a modeled object generated and hosted in a backend enterprise system. Transformation of content items can execute sub-activities within the system. As mentioned above, the data can be of any type, and may be sourced from, for example, an enterprise resource planning system, a customer relationship management system, a business intelligence system, a document repository, a search service, a transactional system, etc. Among the various resources the container may include or be associated with are documents, web services, data objects, etc. The association of the resources with the container causes the content items to be managed within the container instance by the server. The resources provide interfaces for accomplishing work. For example, sub-activities of an activity in a container may be bound to web services host in a backend server.

In one embodiment, the content items are data modeled in multiple dimensions, which can be represented in a specific rendering from one dimension, and manipulated within the container to be represented in a different rendering, for example, from a different dimension. For example, consider a data set that can be rendered in one view and presented in that view. The same or a different user could take, for example, a resulting graph, and render it as a list view, manipulate the data, and then display it in other ways within the container. Thus, the content can be runtime manipulated and re-rendered based on user interaction and user input (e.g., additional information, comments, etc., may be added and rendered with the view of the original content within the container).

Thus, the content of the container may be transformed at runtime (e.g., when the container is active), for example to enrich data or add content. Any content added at runtime, including comments, tags (indications by users), votes (e.g., comments or opinions on something requiring a decision), views to data, or associations of an external content item with the activity, and persisted with the container as the context of the container. Additional activities can also be added to the container, which would generally be activities related to the original activity, and/or activities owned by the same user-owner. Contents of the container can be augmented by additional information associated with the additional activity.

In an implementation where an activity includes multiple action items, one action item (e.g., a first one in a list of action items) can be designated as a principal action item. A user interface displaying the activity can be dynamically adjusted to display data or content of the activity based on the designation of the principal action item. The layout of the data, the views (e.g., list view, graph, line item, etc.) can be associated with particular action items. Each action item may have a default or a defined display function, which can be utilized when the action item is designated as the principal action item. As work is performed, the designation of the principal action item can change dynamically, with updated views corresponding to the updated designations. In one embodiment, content items can be used in the context of a method or tool as a lead artifact, such as bringing up a list of suppliers, and then deciding which supplier to use via a decision method.

In one embodiment, the container is collaborative, which allows concurrent or substantially concurrent work among multiple users within the container. Other users can also be added to the containers. The container can have access attributes, which are associated with a user group of one or more users. The access attribute can be runtime changeable to allow modifying runtime permissions of the container at runtime to add additional users to the restricted group to provide access to the additional user to the container. When multiple users are associated with a container, the users can exchange messages, which messages can be part of the activity container context. The inclusion of a user in one group or being associated with one container does nothing to restrict the ability of the user to access other containers and be associated with other containers.

FIG. 1 is a block diagram of an embodiment of a system that generates a workspace container for performing work related to a user activity. System 100 represents a system in which one or more frontend devices (client devices 112, 114) and one or more servers 130 can interact via network 120. Network 120 can be a wide area network, such as the Internet, or a local area network (LAN). Any type of network infrastructure (e.g., wired, wireless), protocols (e.g., transport protocols, request protocols, access protocols, etc.), architectures, etc., may be used that allow interaction between a client and a server.

It will be understood that each server and/or client or frontend device is a computing device, which is any device that includes processing hardware and memory suitable for performing the operations described with respect to each individual device. Typically the server(s) hosting the workspace framework have more powerful processing resources, and more memory resources than frontend access devices, however, such a system configuration is not strictly necessary. Hardware resources 160 are shown with respect to server 130, and while not specifically shown, it will be understood that similar hardware resources would also be present in each client device.

The client devices may be referred to as frontend devices because they provide direct interfacing with a user to present data and receive user input. Such interaction is possible with server 130, but is more commonly applied through client devices 112 and 114. Server 130 represents one or more servers, which could include any number of hardware and software configurations, any number of devices, etc. In one embodiment, server 130 includes "backend" servers, which are typically associated with an enterprise, such as ERP systems. It will be understood that implementation in an enterprise is not necessary, and server 130 can be implemented, for example, as a server accessible over a wide area network.

Hardware resources 160 includes processor 162, which may include any type of processor, microcontroller, central processing unit (CPU), etc., whether single or multi-core, parallel and/or serial processing, general or specific purpose, etc., which are suitable for running a server (and by extension, suitable for running a client device). The processing resources perform operations on software/firmware instructions, such as instructions defining the framework, the objects, the definitions, etc., which are temporarily stored in, and retrieved from memory 164. Memory resources could include volatile (e.g., any of a variety of types of random access memory (RAM)), and/or nonvolatile memory (e.g., Flash). Hardware resources 160 also include non-volatile storage (e.g., Flash, hard disk), and network interface devices 166 (e.g., network interface cards).

Client device 112 is considered an initiating device for purposes of describing system 100. A user associated with client device 112 requests the execution of an activity. As mentioned above, an activity is associated with one or more users, one or more resources, and a persisted context. It will be understood that reference made herein to a user can refer to a specific user or to a specific role in systems that recognize a specific role as an identifiable individual within the system. Users perform operations via client devices.

Server 130 receives the request to perform the activity, and generates workspace container 132. Server 130 is shown to include workspace server 140. It will be understood that the depiction of workspace server 140 is an abstraction, and systems can be implemented where there is not a "workspace server" separate from the general system servers. The abstraction of workspace server 140 represents the functions and modules that provide the functions necessary to instantiated workspace container 132, and provision content, interfaces, and tools for performing work within the container.

Workspace server 140 includes workspace framework 142, which is a container framework that includes interfaces, methods and tools to allow work to be performed within workspace container 132. Framework 142 includes definitions to implement the interfaces and tools. Workspace server 140 includes data models 144, which may include one or more data models to enable the representation of content items in a uniform way. More detail with respect to data models is provided with respect to certain figures below. Workspace server 140 includes persistence 146, which represents the report or persisted information of container 132. Persistence 146 includes the content items as well as user-generated content generated based on user interaction with container 132 as an interface to get work done. Examples of user-generated content are provided above, and are created at runtime of container 132. The content, both content input or derived from server systems and resources, as well as user-generated content, can be managed by workspace server 140.

Container 132 includes activity 134, which references an activity uniquely associated with container 132. It will be understood that while activity 134 is uniquely associated with container 132, container 132 is not necessarily uniquely associated with activity 134. In particular, in one embodiment, multiple activities can be provisioned within container 132, and activities can be added at runtime. Content 136 represents the content items and the user interaction within container 132.

The user interaction comes at least from client device 112. In one embodiment, client device 112 requests the provisioning of container 132, and solely interfaces with container 132. In another embodiment, other users or client devices are allowed access to container 132. Workspace framework 142 and/or persistence 146 include one or more permission attributes that indicate what users have access to container 132. The attributes can be updated dynamically to add or remove users. As work is accomplished, certain users may be removed seeing their contribution is completed.

In an embodiment where multiple users can access container 132, a work package may be generated to send to client device 114. The work package represents the request from one user to another to perform an activity or a sub-activity. Thus, the illustrated work package sent from server 130 to client device 114 represents a request by client device 112 for a user of client device 114 to accept the performance of one or more actions or sub-activities associated with activity 134, or that operate to accomplish the objective of activity 134. The work package may request that client device 114 perform some or all of the work of activity 134, or request that client device 114 perform an activity related to activity 134.

Resources 150 illustrate resources available in server 130 or via server 130. The resources may be from applications or data stores hosted by server 130, or may be accessible by server 130 from outside server 130 (e.g., from a connected server, or from a connected network, not shown). Examples of resources 150 that may be provisioned for container 132 may include services 152 (e.g., web services or enterprise services) and documents 154 (which may include files, records, data sets, collections, etc.). Content items of content 136 point to resources 150, which represents original content that is incorporated into container 132.

While embodiments of the invention have been described with respect to system 100 of FIG. 1, general descriptions follow without reference to a specific figure. The description may be applicable to one or more figures, as will be understood.

Traditionally separated system functions are syndicated by the workspace framework into one holistic solution that allows one or more users to gather information, make decisions, and drive execution in the context of an activity. The activity has an overarching situation, which is an objective with a context. In one embodiment the situation is a business situation. Situational workspaces or applications provide a framework to manage a set of information spaces needed to accomplish an activity, which may include business tasks. The information spaces are the workspaces, and have a specific work context, as well as data and tools to accomplish the work. In one embodiment, information is split by topic or by activities and can be shared anytime with other people, which may be invited to perform work (e.g., collaboratively) within the activity container.

The content container (also referred to herein as a workspace container or an activity container) allows a user to compose any information and function needed to accomplish an activity. Additionally, other users may be provided access to the container, which would allow such users to work in the context of the container. A server provides or hosts a workspace framework to create and manage the containers or workspaces. The framework may also be referred to as a situational framework, focusing on the framework as providing spaces associated with situations and provisioning content "situationally," or according to need within the container to accomplish the activity. To make the framework robust against domain specific functions, any information is displayed in terms of an abstract content item that serves as a proxy to the actual artifact or original content resource. Thus, content items within the container point to the original data in the server or servers of origin. For example, data records originating from an ERP backend can be assembled and arranged in the same seamless manner as documents or other artifacts. Container interface elements and specialized tools, which can be embedded within the container, can consume content items and arrange the content items into collections, lists, tables, etc., with interfaces generic to all data within the container.

To allow information workers to assemble information as needed, the framework wraps any information into a harmonized content item that can be moved around and added to collection containers. The server that hosts the framework and provides the containers provisions such data through search, browse, and relatedness based recommendations, and makes them available for consumption under the control of the user within the container.

Content containers can store content items as individual elements or as groups, collections, or data sets. For more advanced functions, a set of generic container components offers various generic capabilities of consuming content items. For example, container interfaces or tools may allow inspecting a specific facet of a content item, building collections of items in the form of generic lists and tables, or provide specialized functions such as short listing, building pro/con tables, etc. The containers provide one or more such interfaces that may be predefined as components of any container instantiated. In one embodiment, interfaces within the container allow one or more users to move, inspect, and structure content in the same simple way as known from graphical file management systems. The composition does not depend on assembling UI components, but instead relies on a core set of generic container capabilities and container components (i.e., the interfaces and tools) that result in a very intuitive and consistent way to individually or collectively interact with information within the container, regardless of data type of the data or source of the data. Data from different sources, and originating from different applications may all be similarly accessible within the container.

The container thus provides a simplified authoring environment for activity-centric information spaces, which is based on an abstract content item class that provides all interfaces to interact with the container and its components. Any specific content class implements such generic content item functionality. There is a core set of content adaptors that enable a content class to be searched for and added as a generic content item into the container or item collections. In one embodiment, additional predefined content adapters enable content items to interact with more advanced container components, for example, such as KPI monitors and charts, or comparison tables.

In one embodiment, a hybrid task model is provided that combines the concept of personal task flows with different cooperation models that reflect best practices in organizations or enterprises. In such a system, tasks or activities may be initiated upon system or human requests and pushed to one or several users as individual work packages. Individual users accept or negotiate the performance of work packages to initiate the work. Receivers can also accept and then break down the activity into multiple activities as needed. On each individual phase of a task or activity, the owner can decide to collaborate with a selected set of people and drive an activity collectively by sharing the context that reflects the activity. The context is shared by allowing the others to access the container.

A work package is owned by one user and consists of one or multiple activities, which includes at least one initial activity which is accepting and negotiating the request to perform the activity. Such an initial activity reflects the speech-act relationship between the requesting and performing party. Thus, work packages provide a mechanism for collaboration and engaging in a request to perform relationship among users. Additional activities may either come predefined as part of the work package, or receiving (and accepting) users create the additional activities ad hoc through interaction with the system.

In one embodiment, at runtime the system automatically establishes a conversational context between a requester and a performer. The resulting request-perform context can be modeled as an activity with a content container and collaboration context. The requester and the performer both share the context through the container, and can post speech-acts and share resources which are needed as input or which represent results of a work package.

In one embodiment, an activity is modeled as a hybrid entity which incorporates properties of traditional tasks (e.g., due date, importance, progress status) but also includes rich collaboration context (e.g., people, ToDos, conversations), and a content container that stores information, artifacts and tools related to that activity. Simpler versions of an activity may simply include the content container, personal notes and work context (rather than collaboration context), and ad hoc actions (rather than business process tasks). The user may start to drive an activity from a personal perspective and then later decide to involve additional contributors, whether the activity is the simpler model or the hybrid entity described above, or whether the activity is implemented as a combination of the two. To involve additional contributors, the user can simply invite people into the already existing activity context of the container, and optionally define ToDos, or communicate with all participants to coordinate work within the shared container.

In one embodiment, situational workspaces expose specific data such as KPIs (key performance indicators) or other facets of data that come with a well-defined behavior. Such behavior definition is enabled by the implementation of the concept of a unified content item and container components, as described above. Data may be multi-faceted or multi-dimensional. Composition of the container does not require the existence of content specific UI components, but relies on a core set of generic container capabilities and container components that can be used to interact with content. To bring in custom content, the custom content is enabled as a new content class supporting the set of container APIs (application programming interfaces) that handle composition, organization, and display of content.

In one embodiment, the container can implement the concept of a "lead artifact," which is an important concept with relation to shared spaces in a corporate work context. Such shared spaces would typically be very goal-focused in a corporate work environment, and not just for information consumption. Thus, the lead artifact within a container focuses all participants on the core intent of the activity, which is by extension the core objective of the container. For example, if the focus or objective of an activity is on co-authoring an artifact, the artifact to be co-authored could be provided as the lead content item within the container. If the focus is on creating a short list of candidates, the shortlist could be provided within the container as the lead content item. The lead content item or artifact within a container is runtime dynamic, and can change based on user input that either changes the focus, or completes one focus to move the activity into a new focus.

In one embodiment, the persistence of a container includes a conversation thread, which stores a record of interaction and work within a container. Such a mechanism is useful for informal work assignments within shared containers. Thus, the system can provide a conversation thread for each container by default as well as the possibility to define ToDos. ToDos are similar to Task objects as known from PIM functionality, and may also include the relationship to a resource in a specific container to explicitly model what action is going to be taken in relationship to content in the specific container. ToDos can also be derived from postings as part of the conversation between participants.

In one embodiment, the server or system provides explicit visualizations of the relationship of participants to artifacts. Such explicit visualizations support the quick orientation and coordination of work within a shared container. In the case of shared containers, the visualization may display who is doing what action with respect to an artifact in the shared context of the container. Such information could be listed as a graphical network or in list format. Such information can be useful to determine what resources within the container may be available for work, or which are locked because a data collision may result. Resources may be listed within the server and presented as a visualization for the container to indicate a state of each resource, and whether it is currently available.

In one embodiment, the framework that defines the containers enables built in tools that help users to engage in collaborative settings such as request for proposals, prioritization of alternative options, consolidating shortlists, achieving consensus, interpreting facts, generating ideas and strategies, or investigating problems of high complexity. Such tools organize a container and provide special generic functionality to drive such efforts without being specific to any domain. They reflect common behavior patterns and organizational best practices. In addition to generic shared content containers, the user can set up such focused collaborative environments to support the coordination and efficiency of collaborative work (e.g., with a conversational context container as mentioned above).

Content can be moved from activity to activity. Activities can be created by simply moving content on an empty space within a work package or by copying an existing activity or by selecting a single activity or procedure from a best practice repository. The lead artifact of an activity can change over time to reflect changes in focus. For example, after a short-listing process, the main focus may shift from the collection of candidates to detail out the most promising candidate.

In addition to the collaboration within shared activity contexts, the framework can integrate orchestration functions as well for defining and assigning work packages to different individual performers. Such orchestration can be visualized in list form, or in swimlane showing all or a selected set of performers together with their related work packages, requests, or activities. The orchestration can be derived from ad hoc requests that are performed from within the work package level, or it can be planned top down by individuals or by the company as best practices.

The framework can be used for any kind of process mining, for example estimating predicted and actual workload of people, frequency of execution of procedure templates or activities. It can be used for audit trails, compliance checking, and risk and portfolio management. Each Situational Application instance represents a meaningful business case and depending on the domain represents a portfolio item or case to be managed, aggregated and archived.

Figure 2A:
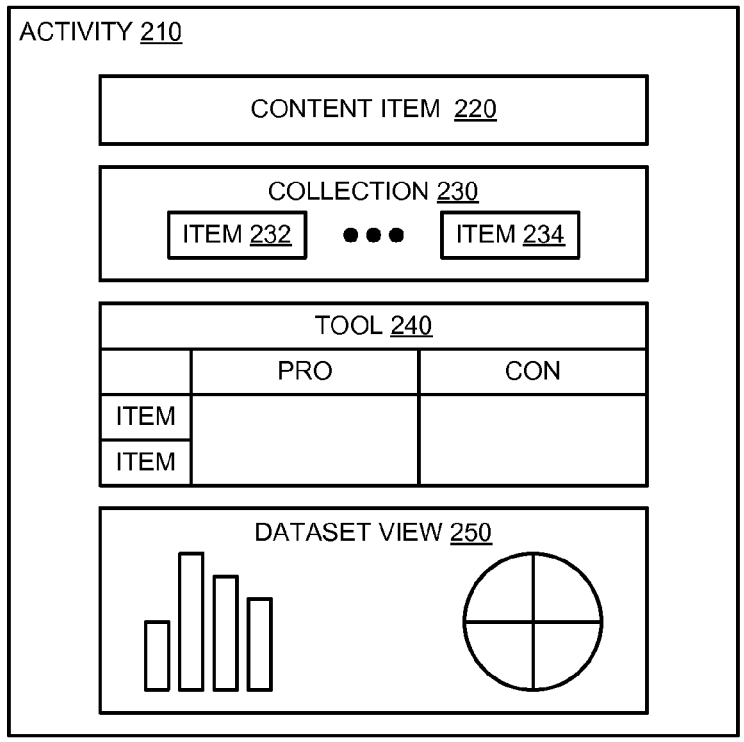
FIG. 2A is a block diagram of an embodiment of an activity within a container.

FIG. 2A is a block diagram of an embodiment of an activity within a container. Activity 210 represents an activity according to any embodiment described herein. As shown in FIG. 2A, activity 210 represents both the activity itself that is the organization of resources to perform work towards an objective, as well as the container generated by the system to allow a user to perform work on the activity. Thus, activity 210 can be thought of from the perspective of the container, as well as the underlying abstract activity itself. Activity 210 represents a container that combines and enables users to manage and/or manipulate data (e.g., business information or information and resources related to the performance of a task of a business process within an enterprise), provision tools for operating on the data, and connect with other people as needed.

Activity 210 can be standalone, or it can be combined by a user into collections to define work sets. Additionally, in one embodiment, activity 210 can be made part of a work package (as described in reference to FIG. 2B) to define a larger business task. Activity 210 can be defined by a user or can be provided by the system as space needed to perform work to respond to a system workflow. Thus, activities can be initiated from users or applications. At one level, activity 210 is a user-managed composition space that leverages the resources and persistence of the server, and allows a user to invite others to share the space to actively contribute. From another level, activity 210 can be thought of as a long-running task or a thinking space.

As a content container, activity 210 enables a user to persist mini application components (e.g., widgets) that can consume and display content items. The container acts as a canvas area to store individual content items or core components, and arrange or display content items in certain ways, rather than as a screen page or publishing tool that can hold UI parts. Users compose content items, not UI parts, within the container.

Activity 210 includes one or more content items 220. Content item 220 abstracts items from any data source into a uniform content item based on a generic rendering framework. The framework abstractly represents the content, which may include registering content types listing properties, relationships, related actions, or KPIs of a particular content class. Additionally, content item 220 may be presented in different ways, for example, as a single item, a list, a table, a graphical display showing the related KPI data set, etc. Thus, the same content can be presented and accessed in different ways.

Collection 230 represents a collection of content items 232 through 234. A collection of content items may add the concepts, for example, of combining data from the content items, rendering the data together, and persisting the data as related. Tool 240 represents one or more tools that may be embedded within the container. The tools may be functions, objects, or mini-applications that provide content manipulation capabilities within the container. The example illustrated within FIG. 2A includes a Pro-Con table that can consume content items, displaying them as items to be commented on.

Activity 210 further includes data set view 250. Data set view 250 represents the capability of the container to render the same data in different ways, and allow runtime manipulation of the visualization of the content. Thus, content that is displayed in a list form could be re-rendered as a graph simply by accessing the container's interface. Additionally, the size of content items can be scaled in a pseudo-continuous way to create the illustration of a scalable content object. For such scaling, the container framework may define a set of renderers for the same entity to switch between different presentations depending on the screen real estate or the zooming factor of the content container. Additionally, views can be transitioned, for example, from a tiled-view, to a collection view, to a master/detail view in a pseudo analog way by shifting the rendering from a tiled view, to an icon view, to a toolbar view.

Figure 2B:
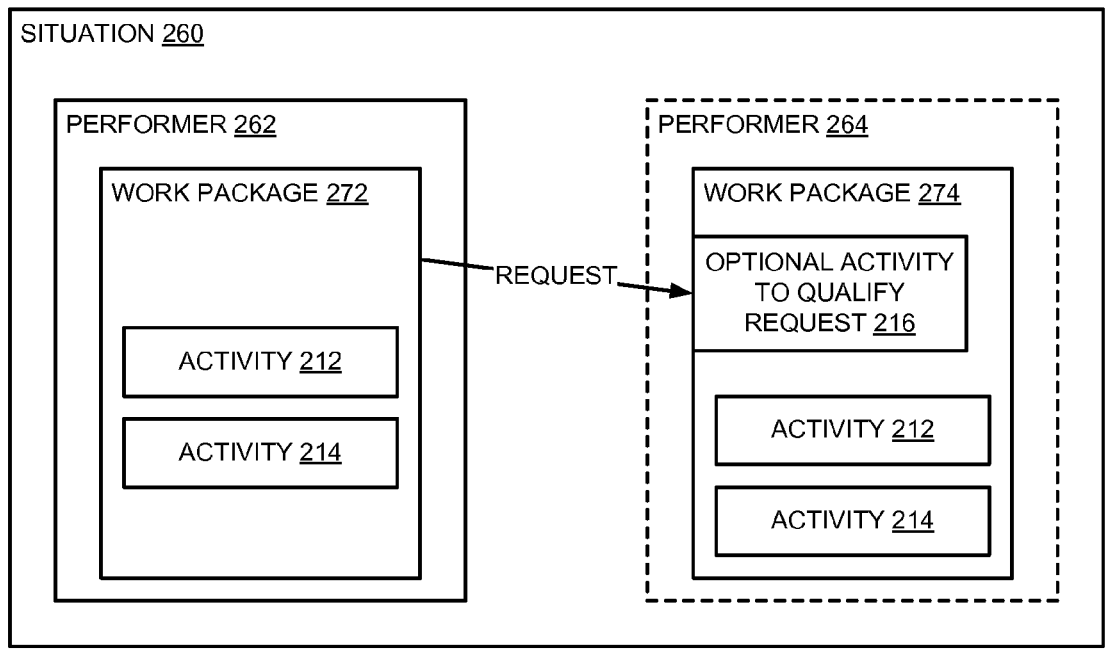
FIG. 2B is a block diagram of an embodiment of an activity as incorporated into a work package.

FIG. 2B is a block diagram of an embodiment of an activity as incorporated into a work package. Situation 260 illustrates a bigger picture of which an activity is a part. Situation 260 may include multiple activities, and represent a larger goal-oriented concept than the objective of an individual activity. The collective objectives of the activities combine to generate the goal of the situation. Within the situation may be two performers, 262, 264, which can accomplish work. Performer 264 is shown with a dashed line because in the example illustrated, performer 264 may not be a performer with respect to the specific activities unless and until the user accepts the request to perform the activities.

Performer 262 is shown having work package 272, including activity 212 and 214. Activities 212 and 214 represent instances of activity 210 of FIG. 2A. It will be understood that the actual content (the container) may not be incorporated into work package 272, but rather a reference to the activities. Performer 262 may want to assign the activities to performer 264. Thus, performer 262 may pass work package 272 via request to performer 264. Mechanically, the server hosting the work package would send the work package to the user's frontend device for acceptance by the user.

Performer 262 is the owner of work package 272, which indicates in the server that performer 262 has responsibility for the activities within the work package. However, if the work package is passed and accepted, it may become work package 274, which is owned by performer 274. In this manner ownership of activities can be changed. Work package 274 may include optional activity 216, which is a qualify request. The qualify request indicates the fact that performer 264 (the receiver) need not simply accept the request, but can negotiate the request with performer 262 (the requester).

Work packages 272 and 274 represent mechanisms to manage multiple work activities that hang together by a common request, event, or work goal. A work package is requested by one requester (e.g., a system event, a workflow task) and performed by one performer. Each work package includes a default activity (see above) shared between the requester and the performer, which reflects the initial request, including initially provided input. The default activity can further include ongoing communication between the performer and the requester. It will be understood that performer 262 could, for example, keep activity 212, and pass activity 214, or split activity 214 into multiple activities to be performed by performer 264, which would be represented by work package 272.

Figure 3:
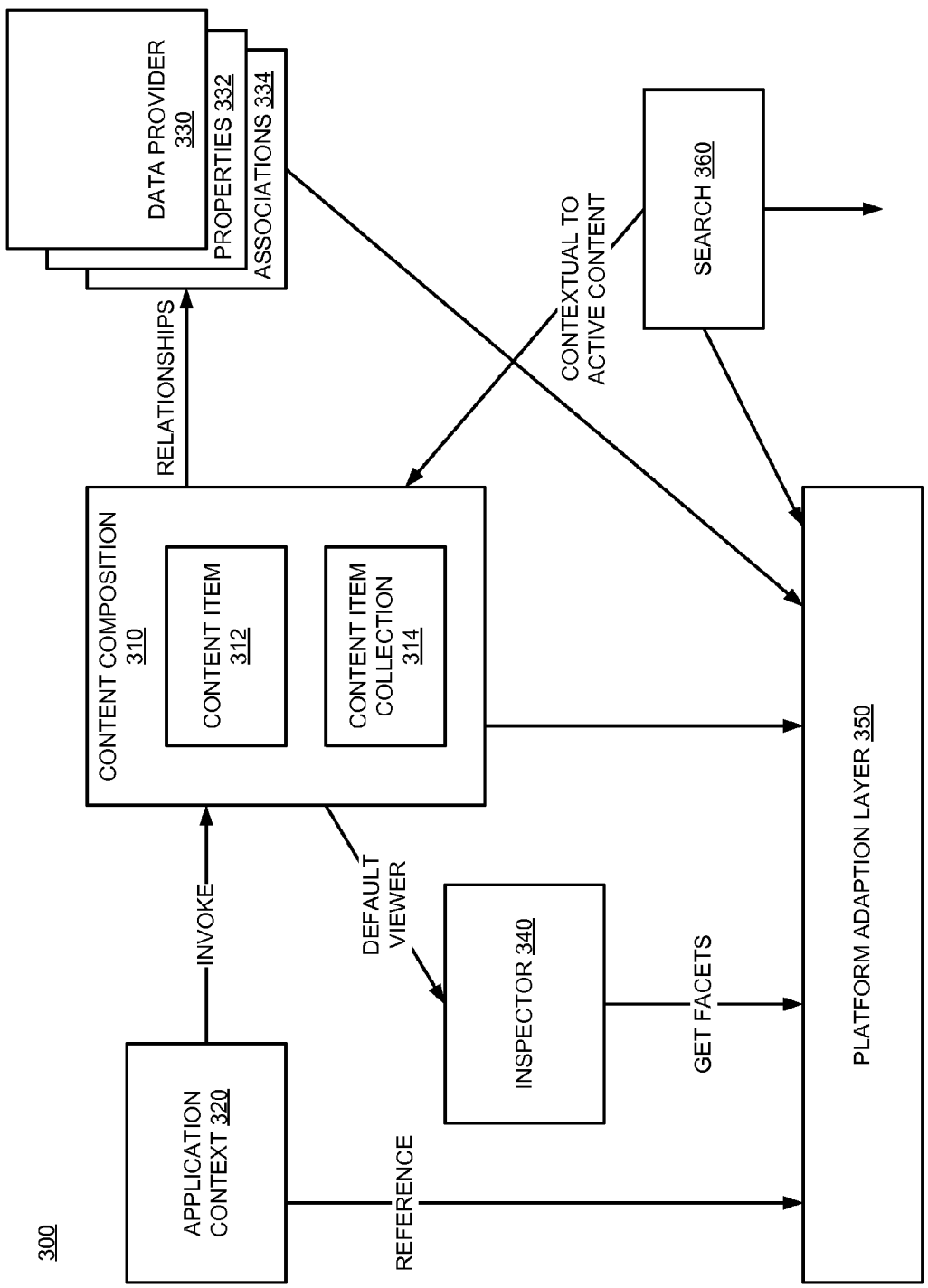
FIG. 3 is a block diagram of an embodiment of a system that supports content composition with abstract content items.

FIG. 3 is a block diagram of an embodiment of a system that supports content composition with abstract content items. System 300 includes a framework that supports content composition 310, which provides a container to generate content items that are abstract with respect to data type and data source. Thus, the content items generated can be uniformly operated on within containers as described herein. Content composition 310 includes an exemplary content item 312, and content item collection 314. The content item is a content item according to any embodiment described herein. The collection includes multiple content items that can be used together or have some common purpose or relationship for viewing, manipulating, or rendering.

As mentioned above, content items can be invoked via user or an application. Applications have an application context 320, and users operate within that context when they work with applications. Thus, content items or collections can be invoked from application context 320. Application context 320 may also include a reference to a platform adaptation layer 350, which defines objects with data content and standard views on the content. Thus, layer 350 enriches content that can be consumed across system 300. The enriched content allows standard interfacing to data from a server or repository through standard interfaces that can be invoked. The reference from application context 320 may be a reference to original content of a content item invoked from a container.

Inspector 340 can check a default view of a content item and obtain more facets about a content item. As mentioned above, content item 312 as a content item include data and views defined that enable interfacing with the content in standard ways. Certain views may be defined, with default views and other views possible on the data. In one embodiment, certain views are defined for content item 312 within the container, and other views can be obtained at runtime. Thus, inspector 340 can determine whether additional facets and additional views are available for content item 312, and obtain those facets for runtime rendering of the content item within the container.

Content items and collections may also have relationships with other content. Such relationships may be defined with respect to data provider 330, properties 332, and/or associations 334. Data provider 330 represents a source of the data content, and there may be relationships defined for the data provider. Properties 332 can be defined for each content item. Specific property definitions may include relationships, and default or standard properties applicable to a content item may define relationships for the content item. Associations 334 may be implemented as metadata definitions of relationships with other content or services within system 300.

Search 360 enables system 300 to search for enriched data elements that may be incorporated into content composition 310. Thus, elements may be located within the system that can be added as system-derived content. Such content is contrasted with user-generated content that includes the interactions of the users with content items within the container. In one embodiment, search 360 may be performed within layer 350 for content items, within other areas of system 300, and within containers. Searching within containers may be performed in a way that is contextual to active content. Thus, content items may be searched within the context of their container, and may include transformations that have resulted from user interaction within the container.

Figure 4:
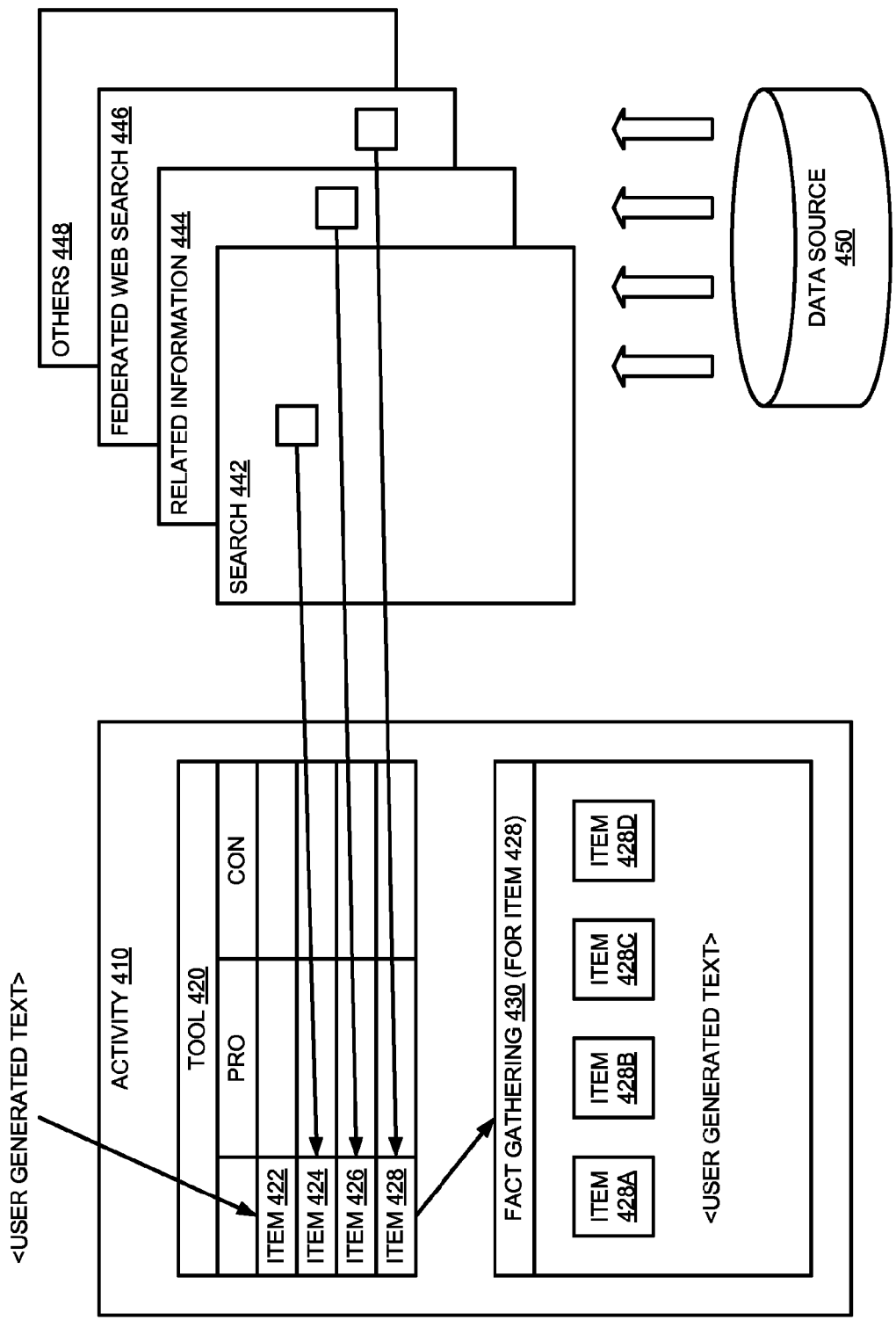
FIG. 4 is a block diagram of an embodiment of a system having tools and methods for transformation of content items of an activity.

FIG. 4 is a block diagram of an embodiment of a system having tools and methods for transformation of content items of an activity. Activity 410 represents an activity and associated container according to any embodiments described herein. Within activity 410, generic tools are illustrated that can be uniformly applied to all content items of the container. Items 422, 424, 426, and 428 represent content items as described herein. Each of the items is shown having a different source. Item 422 is user-generated content. Item 424 is retrieved as the results of search 442. Item 426 is content obtained because it is defined as related information 444. Item 428 is content obtained through web search 446, which may be federated with a search tool within an enterprise. There may be other source types as well, indicated by others 448. Each of the retrieved content items has an original data source 450 within a server or repository of the system in which the activity container is instantiated.

Collective work tools support work on content items within a container. When the container is shared, the tools support goal-oriented collaboration of multiple people in a shared context. The tools coordinate collective work such as information gathering, knowledge creation, decision making, and collective execution (e.g., self-assigning tasks, initiating work streams). The tools include defined APIs to allow tools to consume content items. Thus, the tools can be commonly called to consume the content items of the containers. In one embodiment, the tools allow for definitions that represent best practices of a user, group of users, or company/enterprise.

An example of a tool includes tool 420, which allows for interactively listing and persisting pros and cons of different items for a particular activity (e.g., a list of sellers to include in an aspect of a marketing campaign). Rather than simply having a user make a decision based on looking at different business objects representing different candidates, the tool allows for a content item representing each candidate to be uploaded and compared. The original content representing the candidates does not need to come from the same data source, nor does it need to be of the same type, because it is represented as a uniform content item consumable by tool 420.

It will be understood that within activity 410, the content of one tool may be separately accessed and evaluated, even in different ways, within another tool. The output of one may also be used as input to another. Consider fact gathering tool 430, which evaluates content for item 428. Additional sub-content items may be brought in and considered in evaluating item 428. Such sub-items are content items, but in this example are subordinate or related to item 428, and thus, item 428 is a primary or principal focus item. The sub-items are represented as items 428A, 428B, 428C, and 428D. Additionally, further user generated text can be added in fact gathering 430.

Figure 5:
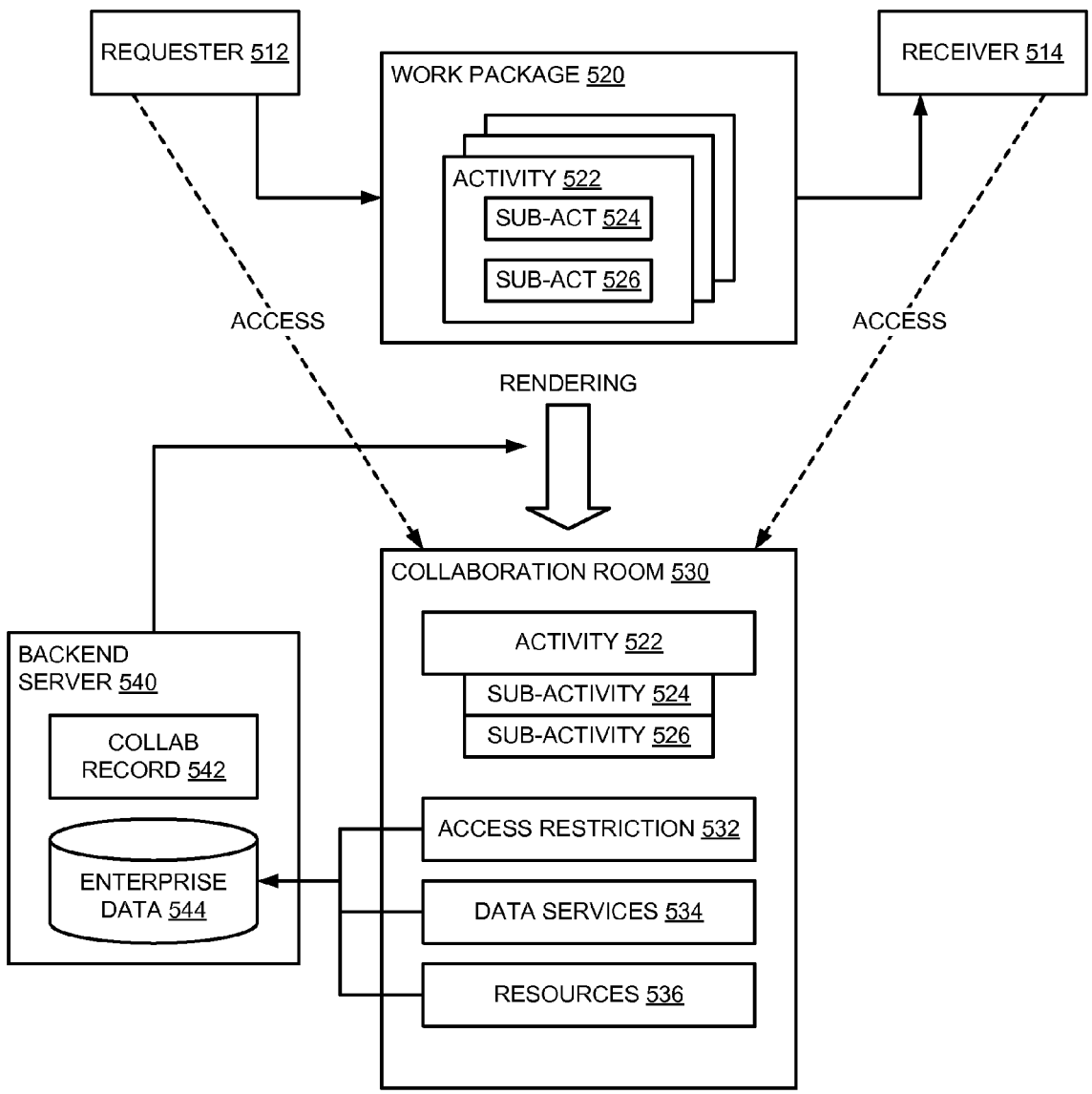
FIG. 5 is a block diagram of an embodiment of a system that allows passing activities in work packages.

FIG. 5 is a block diagram of an embodiment of a system that allows passing activities in work packages. System 500 includes requester 512 and receiver 514, which are frontend devices. Requester 512 sends work package 520 to receiver 514, which accepts the request represented by work package 520, and obtains access to collaboration room 530. Collaboration room 530 is simply a workspace container as referred to above. Collaboration room 530 may exist already, and work package 520 operates to add receiver 514 to it. Alternatively, the acceptance of the work package by receiver 514 may operate to cause collaboration room 530 to be instantiated.

Work package 520 includes activity 522, which requester 512 requests receiver 514 to perform. The activity may include zero or more sub-activities 524 and 526, and may be part of a cluster of activities request of receiver 514. The content of the work package is provisioned to collaboration room 530 and rendered there. In addition to the contents identified by the work package, collaboration room 530 may include access restriction 532, data services 534, and resource 536. Access restriction 532 represents attributes of the container that restrict who can access the container. It will be understood that when a container is shared, all of its contents are exposed to all users joined to the container or users having access to the container. Thus, sharing and access restriction are performed on a container-level, rather than a content item level. Data services 534 represent methods and services to enable the users to do work on the content of collaboration room 530. Resources are the business artifacts or other content items that are associated with collaboration room 530 to enable the users to achieve the objective of activity 522.

In one embodiment, each sub-activity is a business task. When work package 520 relates to a business situation, a container may be initiated by instantiating a business situation and related work packages together with the initial request container and resources provided as input, or a business situation may be self-initiated within a business application by extracting relevant content into the business situation. Business situations can be classified as being of different archetypes and offering typical task life cycle templates to accomplish the business task. Each business task may be a modeled unit of work in the underlying enterprise system, which may be part of a business process.

Backend server 540 represents a server that hosts collaboration room 530, and may more specifically be an enterprise server or enterprise server system. Collaboration room containers need not be hosted by enterprise servers. The server provides collaboration record 542, which is a record of interaction and collaboration between participants of the container. The record may also serve to orchestrate the interaction of the participants. Enterprise data 544 represents a source for access restrictions, data services, resources, etc., which may be part of collaboration room 530.

It will be understood that collaboration may enable compliance with best practices. Traditionally informal collaboration can be persisted based on the container, which can provide an auditable record of work activities. Additionally, different entities may be known as experts, which are brought into a workspace to review and check for compliance. The collaboration record can provide a standardized global conversation thread persisted with the container for each work activity, which allows capturing informal communication and task assignments.

Figure 6:
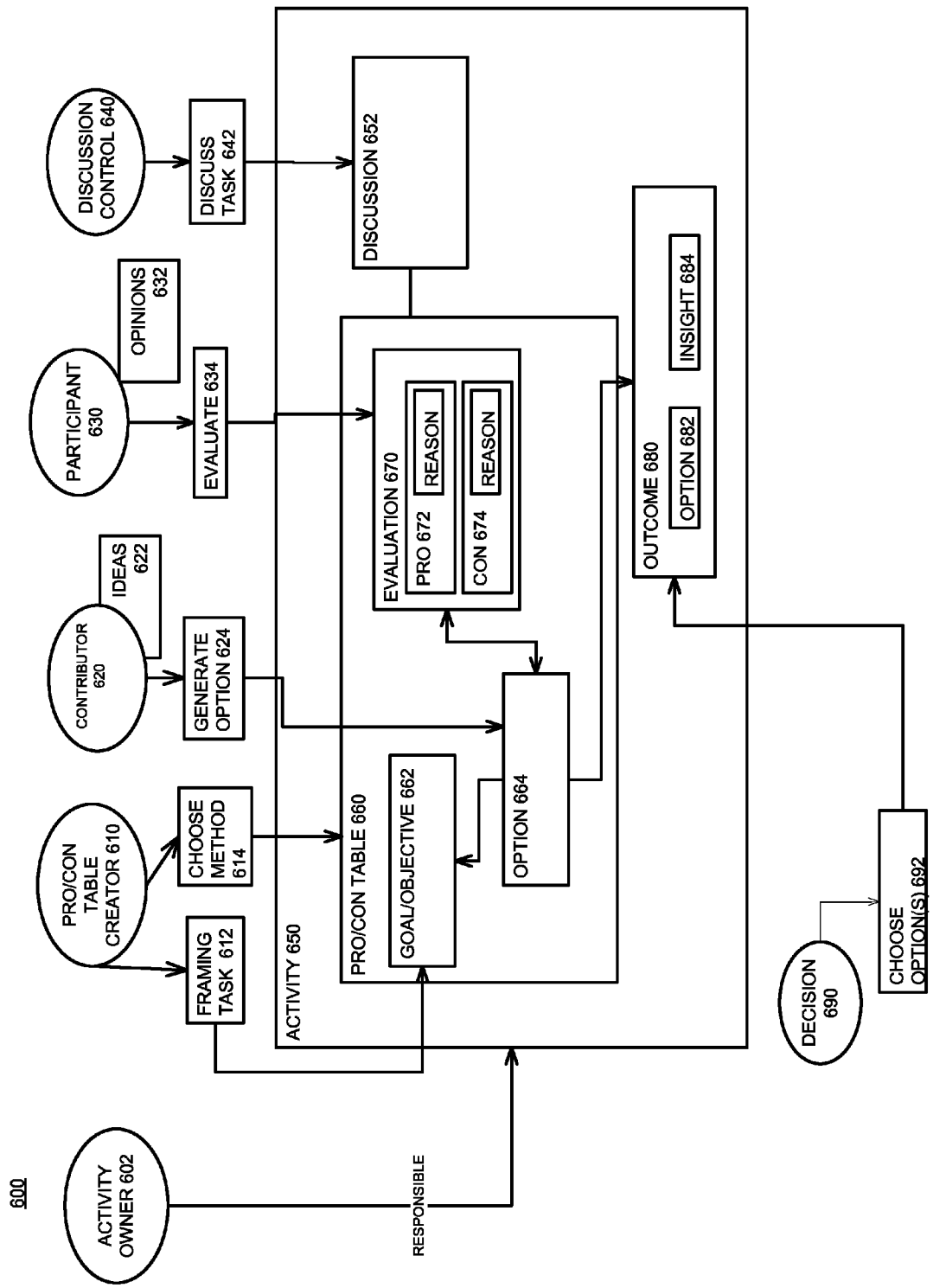
FIG. 6 is a block diagram of an embodiment of an activity workspace container with tools and user relationships.

FIG. 6 is a block diagram of an embodiment of an activity workspace container with tools and user relationships. System 600 illustrates activity owner 602, which is responsible for accomplishing the objective of activity 650, or seeing that the objective is achieved. Activity 650 may include any number of tools for performing work, as illustrated by pro/con table 660 and outcome 680. Activity 650 also includes discussion thread 652, which records the collaboration of multiple performers within the container.

Various relationships with activity 650 enable the work to be performed within the container. The first is owner 602, who is responsible for the activity as mentioned above. There may also be contributors 620, which provide ideas 622, and generate options 624 to be considered as options 664 and acted on within the container. The contribution of a contributor may be by special need, and they may or may not be a long-running participant in the activity. Participant 630 represents an individual who provides opinions 632 and evaluates 634 content of the container. A participant may perform work, and also may or may not be a long-running participant in the activity.

Pro/con table creator 610 may frame a task 612, which results in the goal or objective 662 of activity 650. Creator 610 may also choose methods 614 to implement to accomplish the work of the tool. Pro/con table 660 includes goal or objective 662 as defined by creator 610, and includes options 664 as provided by contributor 620. Pro/con table 670 includes Pros 672 and Cons 674, both of which may include description and reasons. Participant 630 may be primarily responsible for evaluating the pros and cons, just as creator is responsible for the content of the pro/con table, and the contributor is responsible to come up with options to consider. A single individual may fill more than one role. Discussion 652 represents the interaction of the individuals over the course of the work. The discussion is managed by discussion control 640, which includes discuss task 642, which may be initiated by the control to ensure that the discussion is performed and recorded.

Outcome 680 represents the selection of options, with one or more options 682 being provided in light of corresponding insight(s) 684. Decision maker 690 can then choose 692 from among the options, based on the insights provided.

Figure 7:
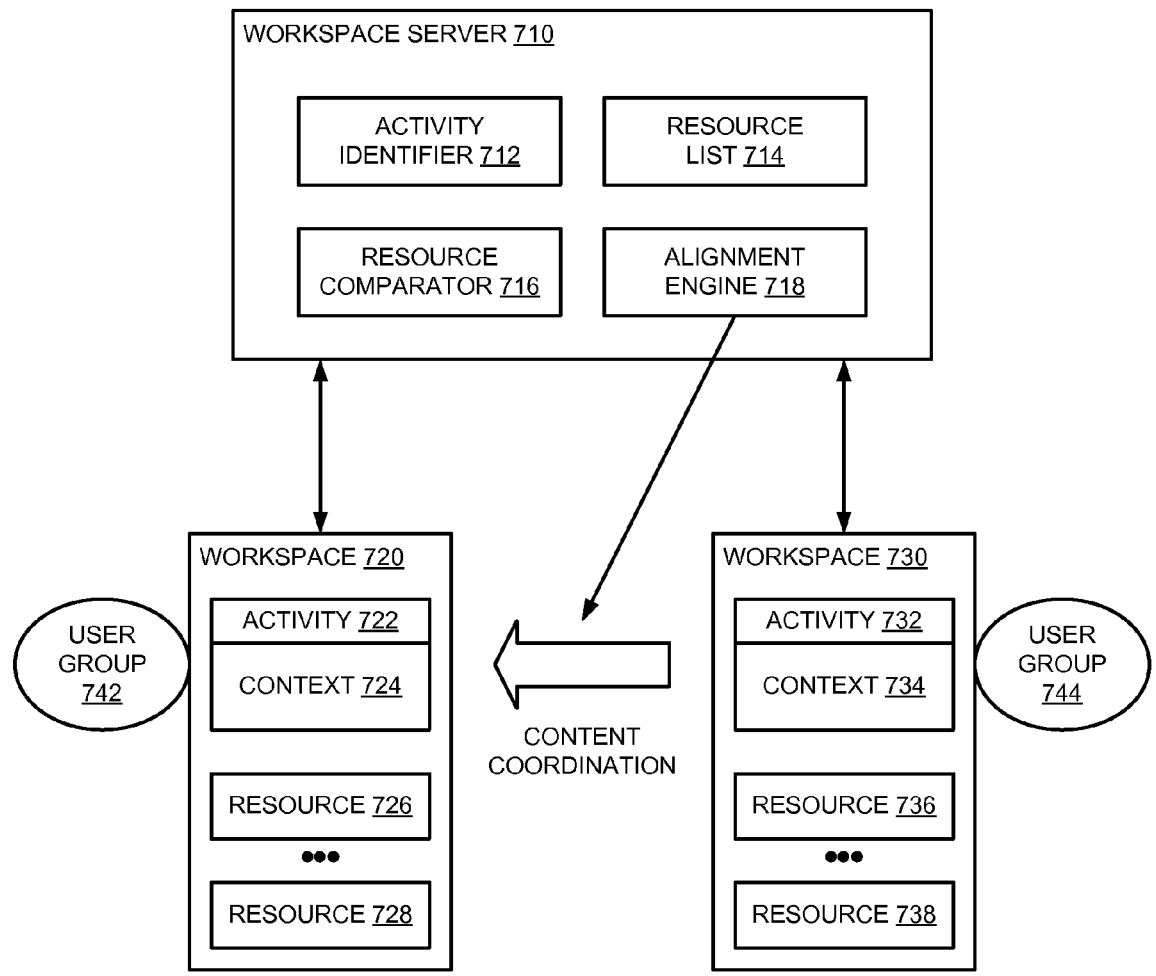
FIG. 7 is a block diagram of an embodiment of a system that aligns container content.

FIG. 7 is a block diagram of an embodiment of a system that aligns container content. Workspace server 710 represents a server that provides or hosts a framework and generates containers as described with reference to any embodiment herein. In one embodiment, workspace server 710 enables the alignment of work based on activities in different containers.

Workspaces 720 and 730 represent container instances or workspaces in which content is presented to associated users. Workspace 720 includes activity 722, having context 724, where the workspace include resources 726-728. User group 742, including one or more users having access to the container, are associated with workspace 720. Workspace 730 similarly has associated user group 744, and resources 736-738. In one embodiment, workspace 730 includes content directed activity 732, which includes a resource of activity 722. It will be understood that some or all of resources 726-728 may overlap with resources 736-738. The contexts of each workspace will be different, and thus, context 724 and 734 are different, even though the workspaces may deal with the related activities, or different aspects of the activity, and similar or the same resources.

In one embodiment, workspace server 710 detects that the same activity is referenced in the two separate containers. Activity identifier 712 represents mechanisms to enable the server to identify the activity reference of various containers. Resource list 714 can also be used by workspace server 710 to determine if similar or the same business artifacts are employed by two containers. If there is an overlap in the resources, there may be content that could be coordinated between the two containers. Resource comparator 716 enables workspace server 710 to determine if the two containers are working on the same or related subject matter. If such a determination is made based on the activity references and the resources, alignment engine 718 enables server 710 to coordinate content between the two.

Thus, in one embodiment, server 710 can discover related activities of work packages and connect different performers. The server may track usage of entities in work activities to discover the usage of the same entity (instance) in different work packages that are not yet connected by belonging to the same business situation. Additionally, the server may notify work package owners that the same instance of a content resource is used in a different business situation in the context of a work package and work activity. The user can decide to connect with the performer of this other activity and possibly integrate two business situations into one.

Figure 8:
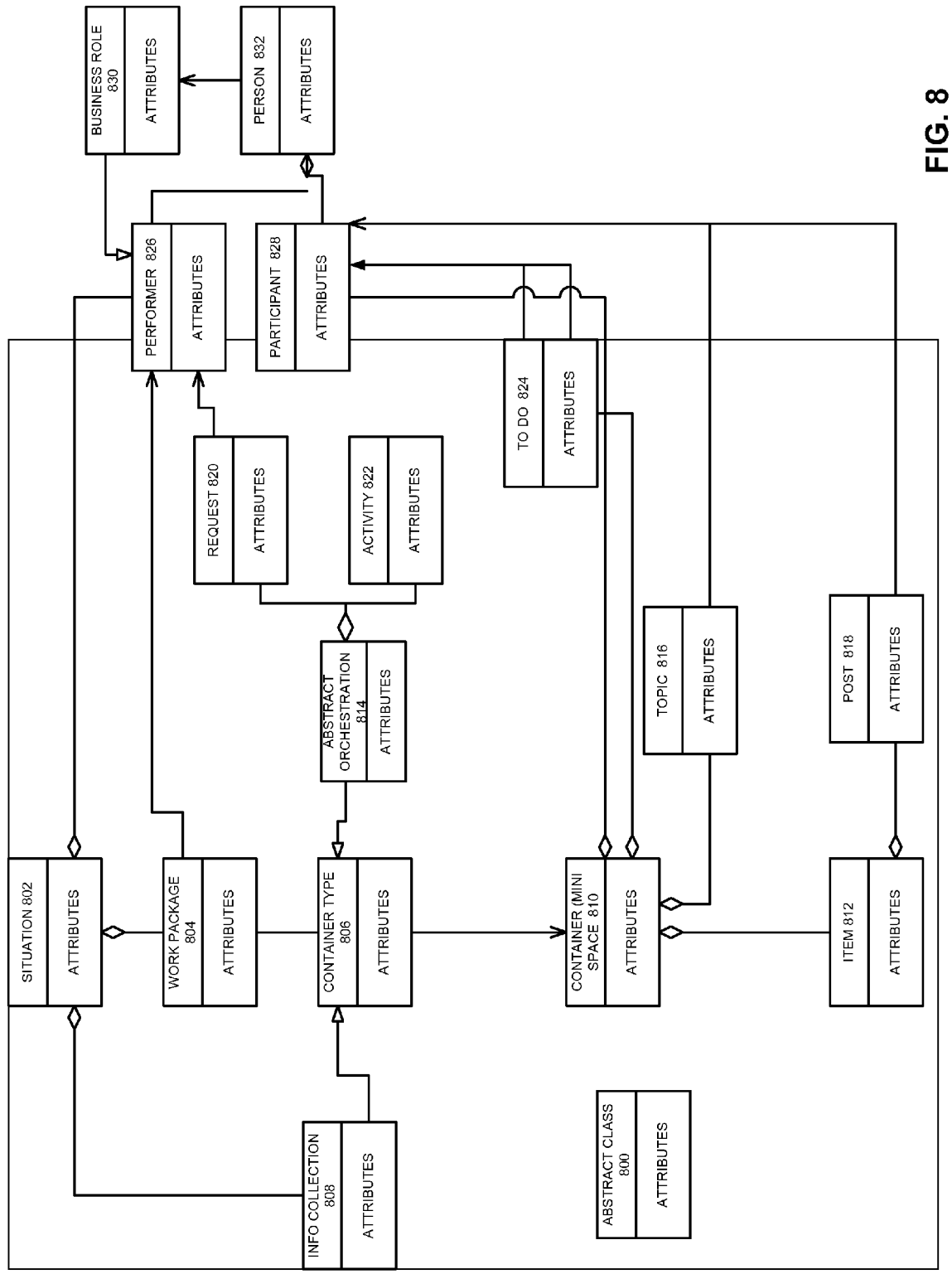
FIG. 8 is a block diagram of an embodiment of an object model.

FIG. 8 is a block diagram of an embodiment of an object model. The data model of the situational applications or workspaces briefly describes attributes and data objects. The data model is flexible and in one embodiment uses current web standards. For example, the data format may be XML (extensible markup language) structure rather than a relational data model. The main focus on XML is that it is hierarchal and all properties or child nodes are in the focus of one object. Query languages like Resource Description Language RDF (e.g., ERDF, RDFa) could be used. Pure data may be extracted from XML via JSON.

For the descriptions that follow, the attributes written in italic are optional. The first value is the name, second is the type, and third is a short description of the attribute.

Data configuration supports the use of multiple situations within one application. A data configuration contains references of the XML files which are important for the application. The Attributes may include 'Situations: Situation [ ]', which is an array of all references to the situation, which should loaded, and 'Files: File[ ]', which is an array of all references to the file of other things needed.

Participants include any person, group, or role that is fulfilled by a person. A participant is the main construct for sharing, assigning, or requesting. A participant is the main actor in this application. Object: PersonData 832 describes a real life person who act in the application. Attributes of person 832 may include: id: Number (Identifier of the Person); lastname: String (Last name of the Person); firstname: String (First name of the Person); street: String (Zip code); state: String(2) (State); phone: String (Phone number); cellpone: String (Cell phone number); image: url (Location of the image of this person); mail: String (Email address); position: String (Position of the Person); and, roles: Number[ ](Role.id) (Relation to the Roles).

Object: RoleData (or business role) 830 describes a functional skill set of one or a number of persons. Attributes of role 830 may include: id: Number (Identifier of the role); and, name: String (Name of the role).

Resources are data describing all external resources that should be available in the application. Attributes of Resources may include: id: Number (Identifier of the resource); type: File[ ] (Type of the resource); and, url: URL (The url to the resource).

Object: Abstract Class 800 is the super class for all in the application available classes. Attributes of abstract class 800 may include: id: String (Name of the Situation); creator: Person (Creator of the object); creationDate: Date (Creation time of the object); modifier: Person (Modifier of the object); modifyDate: Date (Modification date and time of the object); and, modifyDescription: Text (Description of the modification).

Object: Situation 802 describes one instance of a scenario. Its attributes may include: name: String (Name of the Situation); description: String (Description of the Situation); collections: InfoCollection[ ] (Collection of all public Info Collecitons within the Situation); workpackages: WorkPackage[

] (Collection of all Work Packages within the Situation); and, performer: Person[ ] (All Performers within the Situation).

Object: Work Package 804 describes a set of personal activities, made requests, and created information collections. A situation has a strong relationship to a performer, so it is a one-to-one connection. Its attributes may include: owner: Number(Person.id) (The owner of the Work Package); name: String (The name of the Work Package); description: Text (The description of the Work Package); and, containers: ContainerType[ ] (The referred child containers for this Work Package).

Object: Container Type 806, where a container is the super class for activity, information collection and request. It holds a reference to the container and has some special attributes. Its attributes may include: name: String (The name of the Work Package); description: Text (The description of the Work Package); container: Container (The reference to the Container); isPrivate: Boolean (A flag that's say if it private or not); and, attributes: Object[ ].

Object: Info Collection 808 has the purpose of holding information without having influence on the work that is to be performed. It holds just the reference to a container for supporting information.

Object: Activity 822 is a self initiated reference to a container for a special purpose with a special attribute. Within this container the work is accomplished. Its attributes may include: startDate: Date (Starting date of the activity); dueDate: Date (Ending date of the activity); and, state: "Planned"|"InProgess"|"Closed" (Current state of the activity).

Object: Request 820 is a formal invitation for work. It has special attributes and a reference to a container for negotiation or conversation. It the communication channel between the initiator and the performer. Its attributes may include: startDate: Date (Starting date of the request); dueDate: Date (Ending date of the request); performer: Person (The related performer); and, state: "Requested"|"Accepted"|"Declined"|"Solved" (The current state of the request).

Object: Container 810 is the main working space in this application. It contains items, conversations, and ToDos. Only a container can be shared to a number of participants. In one embodiment, the first item in a container is the leading item. Its attributes may include: items: Item[ ] (The contained Collections); participants: Person[ ] (Collection of the shared Participants); todos:Todo[ ] (The todos within the Container); topic:Topic[ ] (The topics within the Container); and, (dependency: RegExp (A dependency, which allows to set a Workflow (is not well specified yet))).

Object: Item 812 describes the reference to the content. It provides different views for the content. Its attributes may include: attributes: Array[ ] (Special attributes for content (special for each of the types)); currentView:View (The current view which should be rendered); posts:Post[ ] (All the posts that are related to this item); and, linkedTo: Number (Item.id).

ToDo 824 is a description of an informal request to do something. An informal request means that the actor becomes access to the container and gets information about that. Its attributes may include: subject:String (The subject of the ToDo); text:Text (The plain text for the ToDo); state: "Requested"|"Accepted"|"Declined"|"Solved" (State of the todo); dueDate: Date (Ending Date); initiator: Number(Person.id) (Identifier of the Person who is the initiator of this ToDo); performer: Number(Person.id) (Identifier of the Person who is the actor of this ToDo); and, isPrivate: Boolean (Flag for visibility to other participant in this container who are not actor or initiator).

Topic 816 is a grouping of different post. It has a special purpose. Its attributes may include: subject: Text (The supject of the topic); author: Person (The author of the topic); date: Date (The creation date of the topic); and, posts: Post[ ] (The child post for this topic).

Post 818 is a kind of conversation, comments, notes, or discussion. All these things can be stored in as a post. Its attributes may include: text: Text (Text of the post); date: Date (Timestamp of the post); author: Person (Author of this post); and, isPrivate: bool (Visibility of the post).

Figure 9:
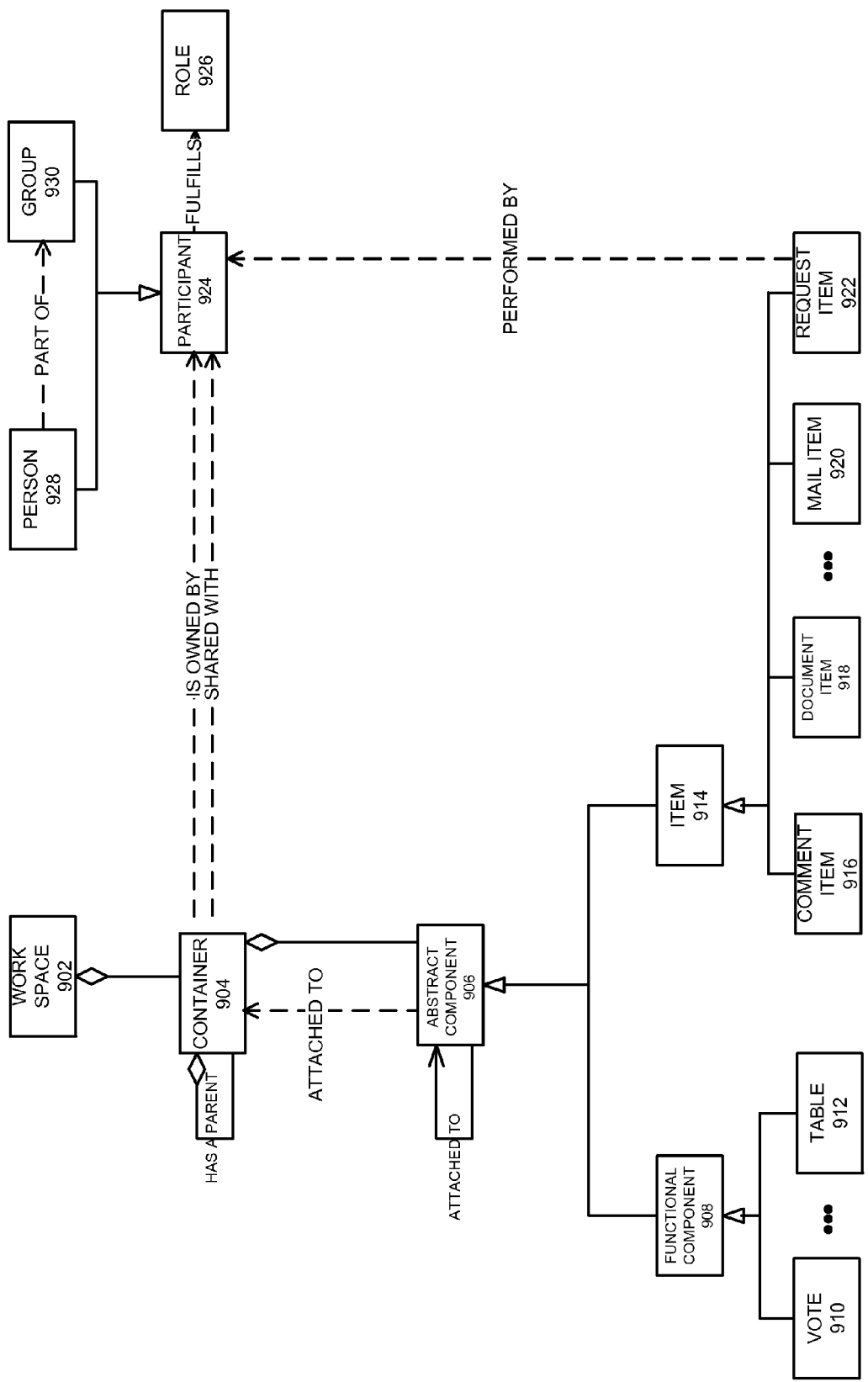
FIG. 9 is a block diagram of an embodiment of another object model.

FIG. 9 is a block diagram of an embodiment of another object model. The model includes workspace 902, which has a one to many relationship with container 904. Container 904 has a parent, which may be the parent of multiple containers. Container 904 is owned by a participant 924, and may be shared with one or more participants 924. Container 904 further can be associated with many abstract components 906, which are attached to container 904. Abstract components may also be attached to themselves. The attachment to the container indicates their association with the container, while the attachment to themselves indicates a grouping of components.

Functional component 908 may be an abstract component, and functional component 908 may itself be vote 910, table 912, or other item. Item 914 may be an abstract component, and may itself by made up of one or more comment items 916, document items 918, mail items 920, request items 922, or other items or artifacts.

Participant 924 fulfills role 926, and may be composed of persons 928 and/or groups 930. Person 928 may be a part of group 930.

Figure 10:
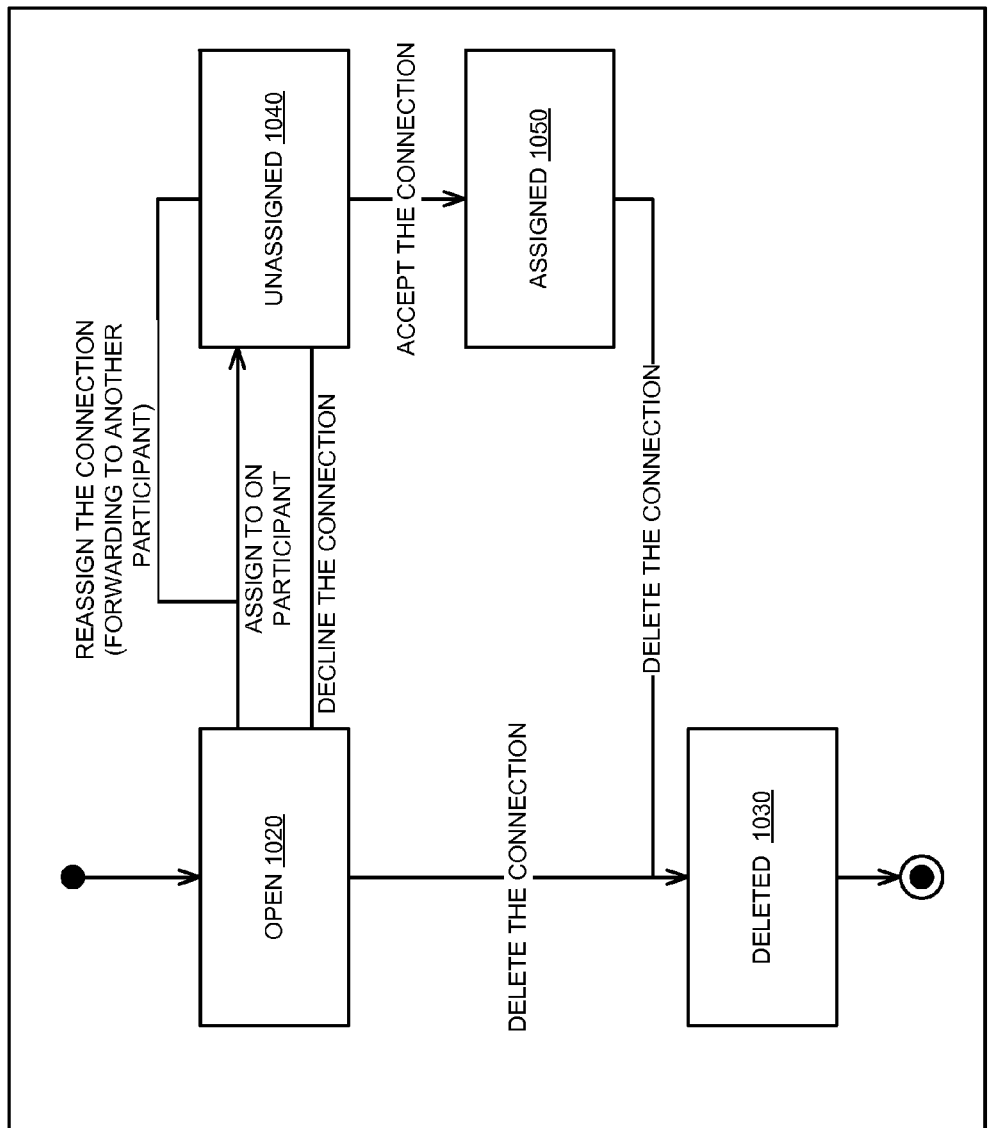
FIG. 10 is a block diagram of an embodiment of a content item connection state machine.
Figure 10:
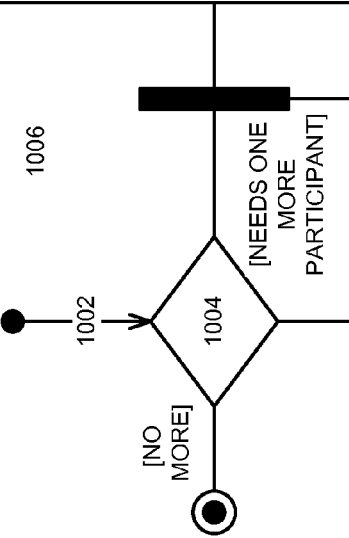

FIG. 10 is a block diagram of an embodiment of a content item connection state machine. With reference to adding a connection, the connection is opened, 1002, and if it has received enough entities as input, 1004, there are no more to add. If the connection needs one more participant, 1004, 1006, a new input is awaited to open the connection.

When opened, 1020, the connection has nobody as a participant. Open 1020 assigns to one participant. Unassigned 1040 means that there is a participant referred to, but the connection is not yet accepted. The connection can then be reassigned (forwarding to another participant) until it is assigned. The connection may also be declined (e.g., a participant declines a request). If the connection is accepted from state unassigned 1040, the state moves to assigned 1050. An open 1020 connection can also be deleted, which results in a deleted 1030 connection. An assigned 1050 connection can also be deleted.

Figure 11:
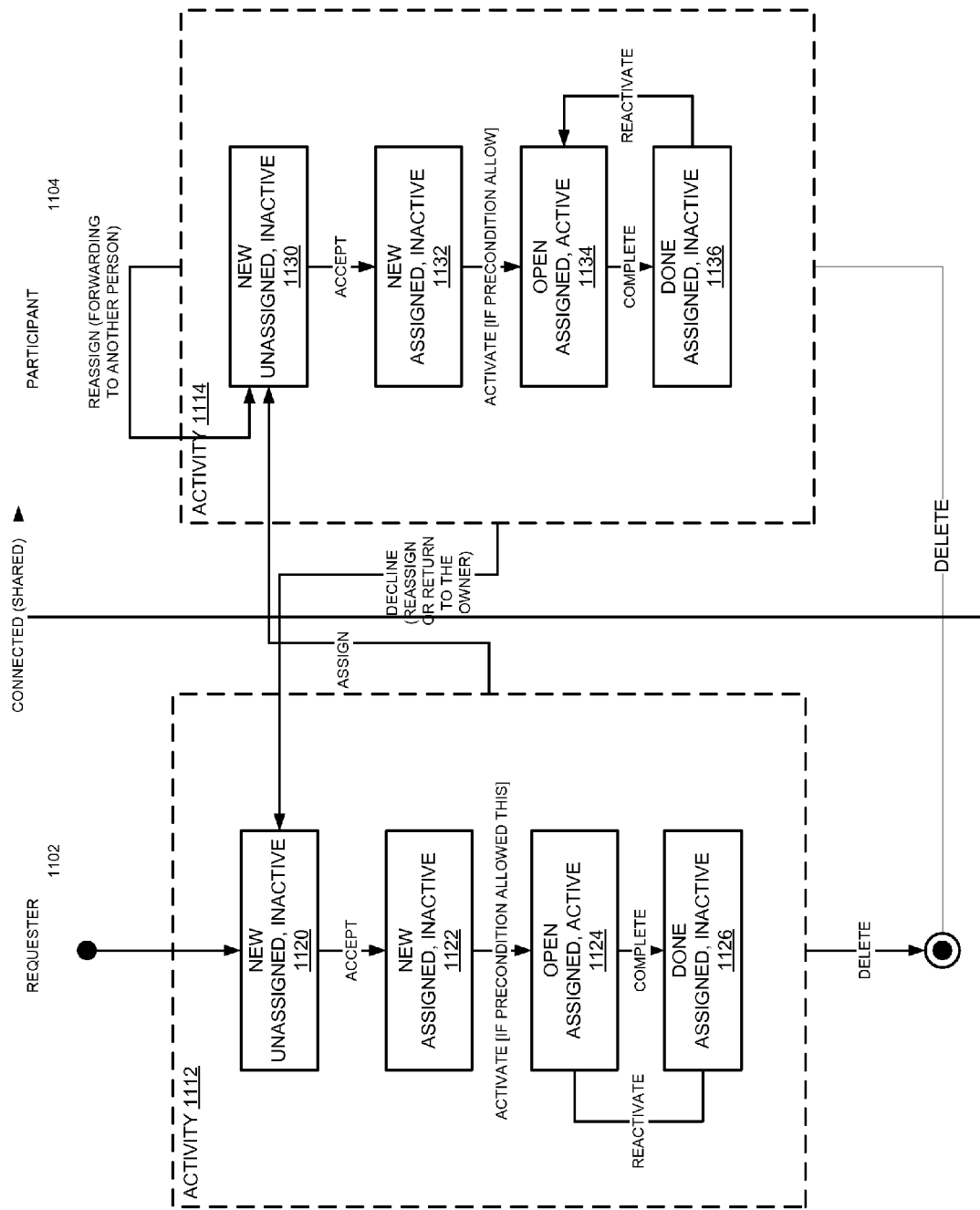
FIG. 11 is a block diagram of an embodiment of a content item as a task.

FIG. 11 is a block diagram of an embodiment of a content item as a task. Requester 1102 generates a shared connection with participant 1104. Activity 1112 represents the task of the content items, and is associated with requester 1102. Activity 1114 represents the task as shared, and is associated with participant 1104. The states of activity 1112 may include new states 1120 and 1122, with 1120 being unassigned and inactive, and state 1122 being assigned and inactive. If requester 1102 accepts the activity, the task moves from unassigned (1120), to assigned (1122). When requester 1102 activates the task, assuming preconditions allow, the task becomes open, assigned and active, 1124. When the task is completed, the task is done, assigned and inactive, 1126. The task can be reactivated and moved back to open (1124).

Instead of performing the task, requester 1102 can delegate the task to participant 1104. Activity 1114 includes similar states as activity 1112. Namely, the task starts as new, unassigned and inactive, 1130, and becomes new, assigned and inactive, 1132, when accepted. When activated, assuming preconditions allow, the task becomes open, assigned and active, 1134. The task can be completed and become done, assigned and active, 1136, which can then be reactivated back to state 1134.

At any time during the processing of activity 1112, requester 1102 can attempt to assign the task to participant 1104. The participant can reassign the task to another person, or attempt to, or decline the task, which reassigns or returns the task to the owner. At any time, a user can also delete the task.

Figure 12:
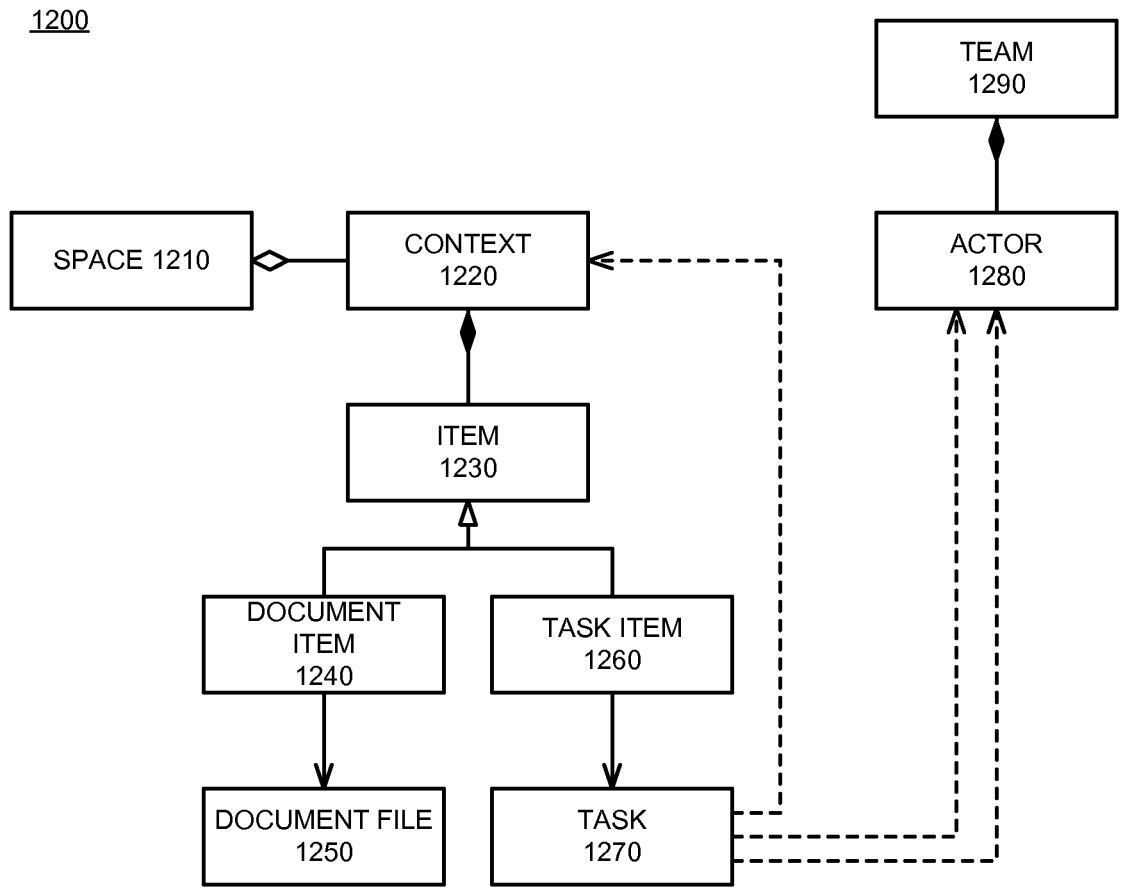
FIG. 12 is a block diagram of an embodiment of a request to perform data model.

FIG. 12 is a block diagram of an embodiment of a request to perform data model. Data model 1200 includes space 1210, and there may be many contexts 1220 within a space. Space 1210 is a space to create containers or provisioned workspaces. Context 1220 can be derived from task 1270, and may have a defined set of items 1230 that are part of the context. Context 1220 has at least one item 1230. Each item 1230 may be a document item 1240, which points to a document file 1250, or a task item 1260, which points to a task 1270. Each task 1270 is requested by an actor 1280, and is performed by an actor 1280. There may be a defined set of actors 1280 that are part of a team 1290. Team 1290 has at least one actor 1280.

Figure 13:
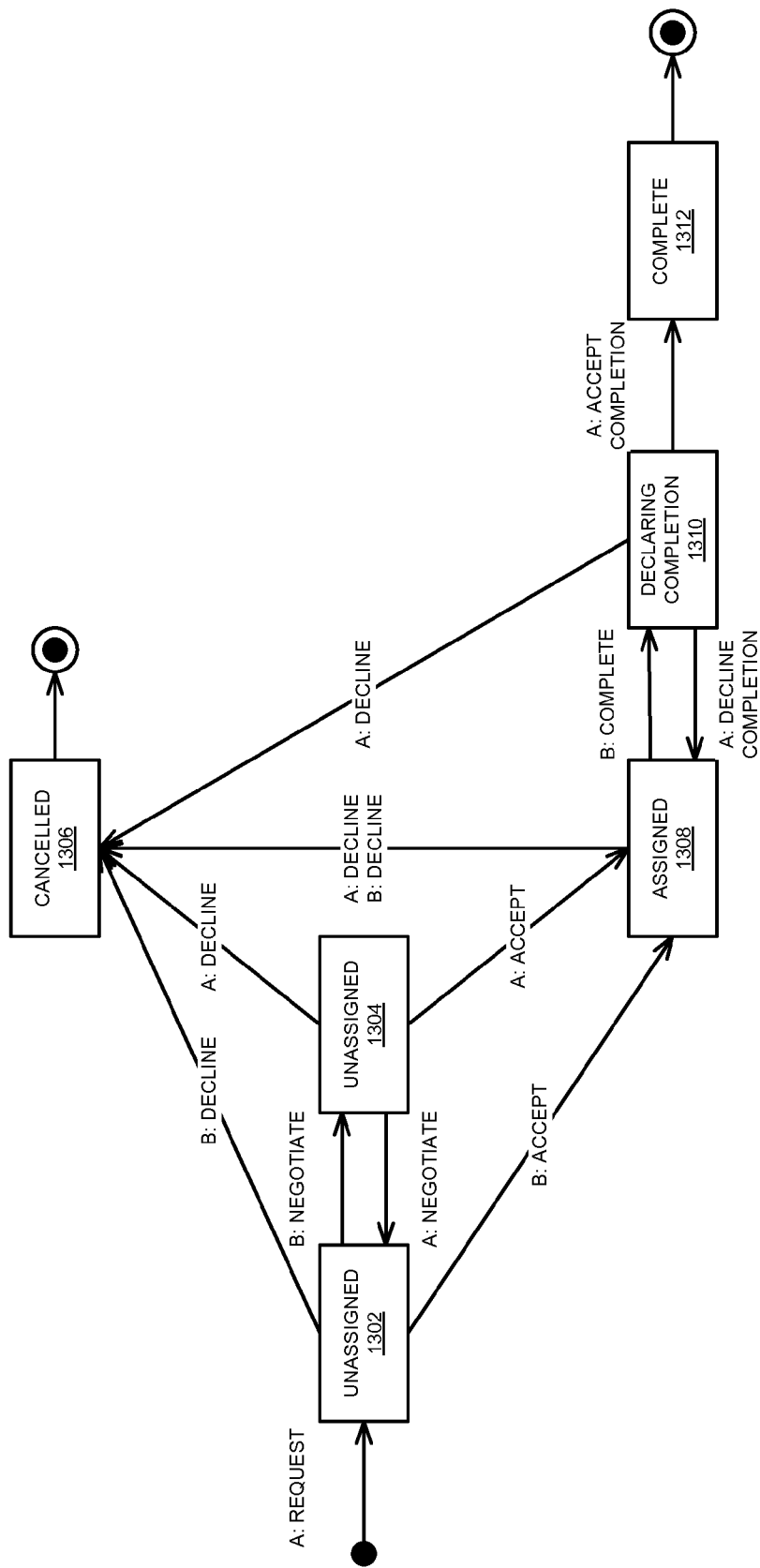
FIG. 13 is a block diagram of an embodiment of a request to perform state machine.

FIG. 13 is a block diagram of an embodiment of a request to perform state machine. A request is received as an input. For purposes of the state machine, there are considered to be two entities, A (the requester) and B (the receiver). A makes a request, which results in unassigned state 1302. B can decline the request, which results in canceled state 1306. B could accept the request, resulting in assigned state 1308. Alternatively, B could negotiate the conditions of the request, moving to unassigned state 1304, which represents an active negotiation. From unassigned state 1304, A may decline the negotiation proposal, resulting in moving to canceled state 1306. A could accept the negotiation proposal, moving the process to accepted state 1308. Otherwise, A could propose another negotiation position, moving back to unassigned state 1302. The negotiation process between A and B could continue until acceptance or canceling results.

From assigned state 1308, either A or B can choose to decline, resulting in canceled state 1306, which ends the process. From assigned state 1308, B can complete the activity, moving to declaring completion state 1310. A can decline the task, resulting in a canceled task at state 1306. A can decline completion, indicating that B's declaration of completion is not accepted or not agreed with, thus moving back to assigned state 1308. From state 1308, the process of performance by B, followed by the declaration of completeness and evaluation by A can continue until acceptable completion is achieved. If A accepts completion, the process moves to complete state 1312, which successfully ends the process.

Figure 14:
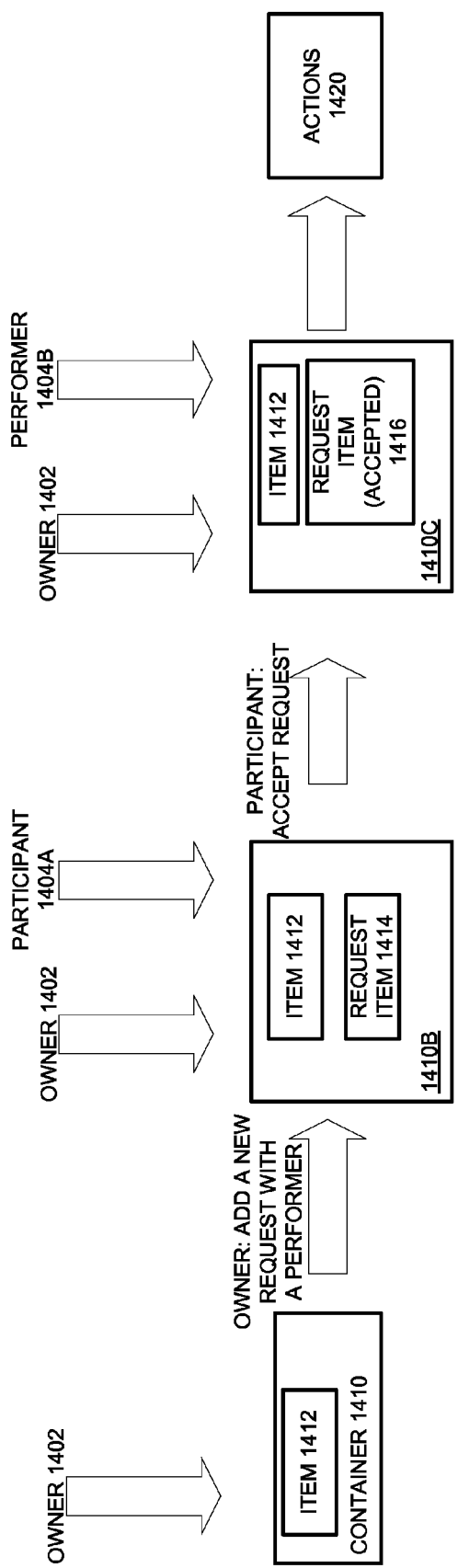
FIG. 14 is a block diagram of an embodiment of a flow of requesting.

FIG. 14 is a block diagram of an embodiment of a flow of requesting. Owner 1402 initially owns container 1410. Container 1410 includes item 1412. Owner 1412 can decide to add a new request with a performer, which could result in adding a participant to the container. When the request is made, container 1410 is illustrated as container 1410B, representing a state of negotiation between owner 1402 and participant 1404A. If the participant accepts the request, container 1410 is shown as container 1410C, where the participant is shown as performer 1404B, having been successfully added to the container. The request item is accepted item 1416, and its content is updated to show the successful request and acceptance. Both owner 1402 and performer 1404B have access to container 1410, and can perform actions 1420, which represent the interactions of the users within the container. New content items can be added, additional containers may be created that are related to container 1410, the request state may be set to a "done" state, more participants may be added to the container, a new container could be created within container 1410, etc.

Figure 15:
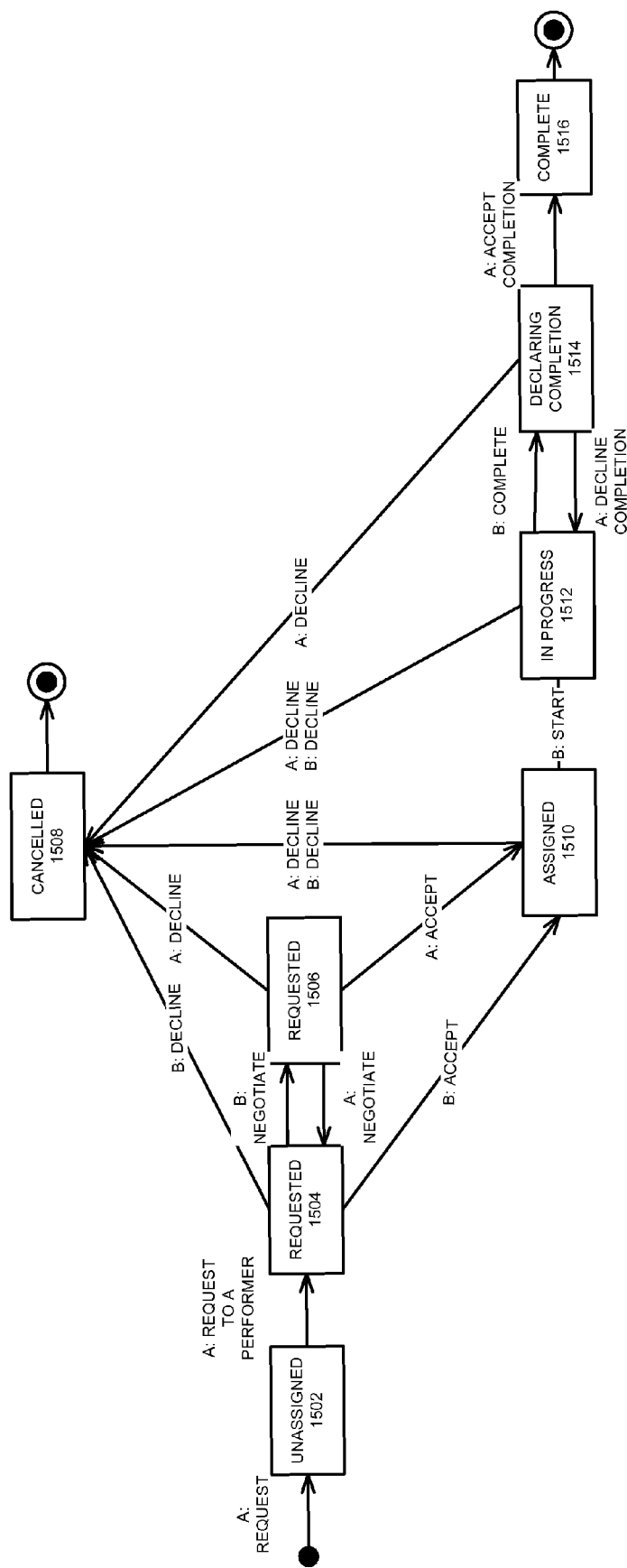
FIG. 15 is a block diagram of an embodiment of a requesting state machine.

FIG. 15 is a block diagram of an embodiment of a requesting state machine. For purposes of the state machine, there are considered to be two entities, A (the requester) and B (the receiver). A makes a request, which results in unassigned state 1502. A makes a request to a specific performer (B), which results in requested state 1504. A and B can negotiate the request between states requested 1504 and requested 1506. B can decline the request from state 1504 and cancel the request process unsuccessfully at canceled 1508. Likewise, A can decline the request from state 1506 and cancel the request process unsuccessfully at canceled 1508.

If B accepts at requested state 1504 or A accepts at requested state 1506, the process moves to assigned state 1510. A or B could decline the request from that state, causing the unsuccessful canceling 1508 of the process. If B starts the task, the task moves to in progress 1512, from which both A and B could decline the task, canceling 1508 the task. From state in progress 1512, B completes the task, declares it completed 1514, and waits for A to accept the completion. A can decline the task entirely, resulting in canceled state 1508, or can decline completion, returning to in progress state 1512. Once A accepts completion of the task, the process moves to complete 1516, and ends.

Figure 16A:
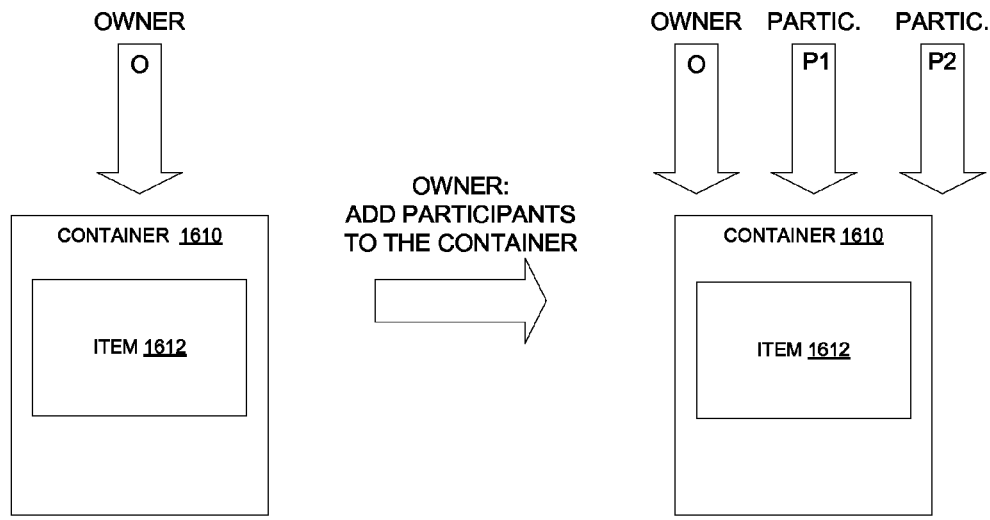
FIGS. 16A-16C are block diagrams of an embodiment of sharing containers.
Figure 16B:
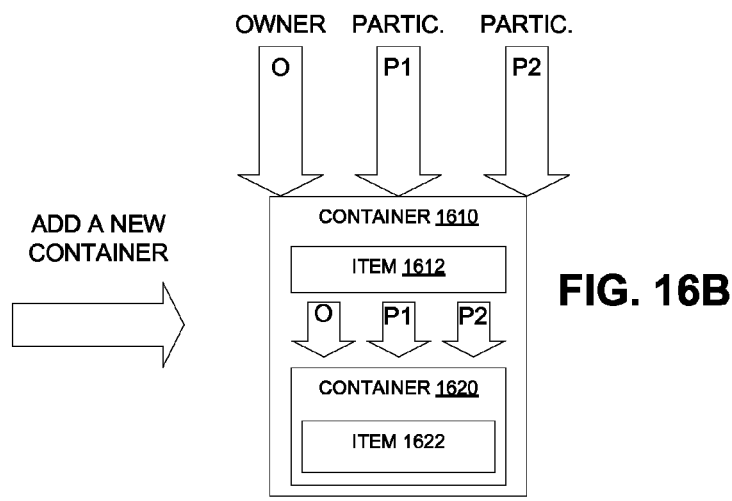
Figure 16C:
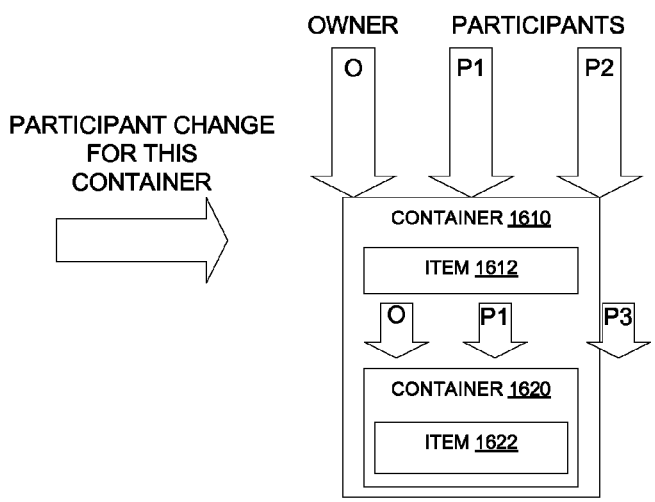

FIGS. 16A-16C are block diagrams of an embodiment of sharing containers. Sharing is performed on the container level, or at the activity level, and not at the content item level. Thus, in one embodiment, sharing does not result in a change of responsibility for an activity without sending the container as a work package. In FIG. 16A, Owner 'O' owns container 1610, which includes content item 1612. The owner can choose to add participants to container 1610, which would successfully result in owner 'O' and participants 'P1' and 'P2' having access to container 1610 and its contents.

In FIG. 16B, a new container is added within container 1610. In one embodiment, when a container is created, the default participants are the same as for a parent container. After creating, if the participants are changed, there is no longer an inheritance to the parent container. Access to a container can be "Inherit from Parent" or "defined by Participants." Thus, adding new container 1620 within container 1610 results in all user 'O', 'P1', and 'P2' having access to container 1620 and its contents, including item 1622.

In FIG. 16C, the participants are changed for the containers. As shown, participant 'P2' still has access to container 1610, but participant 'P3' has access to container 1620 in place of participant 'P2'. The participants were changed, resulting in a defined user group, rather than an inherited one from the parent (container 1610). 'P3' could replace 'P2' in container 1620, for example, if 'P2' sent a work package to assign the activity of container 1620 to 'P3'.

Figure 17:
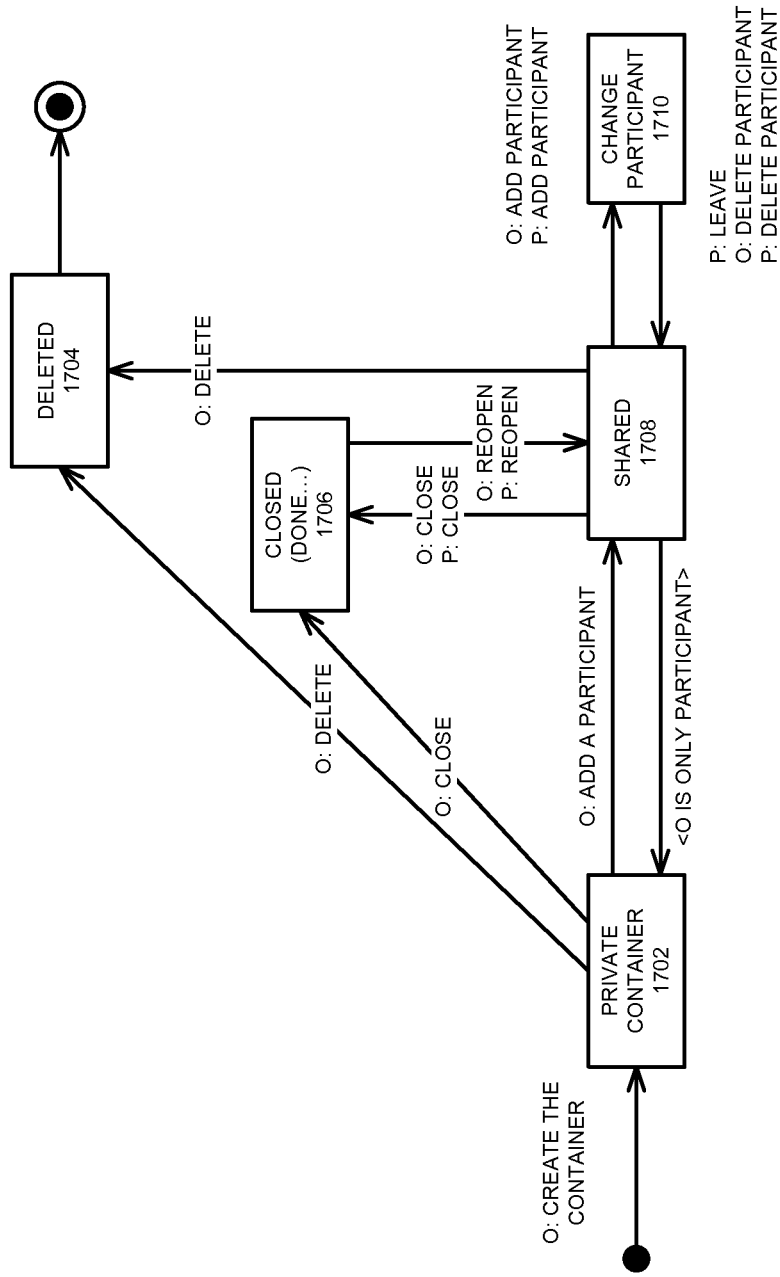
FIG. 17 is a block diagram of an embodiment of a state machine for sharing containers.

FIG. 17 is a block diagram of an embodiment of a state machine for sharing containers. For purposes of the state machine, there are considered to be two entities, O (the owner) and P (the participant). The owner creates the container, or the system creates the container associated with the owner. The container then exists as a private container in state 1702. From state 1702, the owner could delete the container, resulting in a deleted container in state 1704. The owner could instead close the container, resulting in closed (or done) container in state 1706.

The owner could also choose to add a participant, which would result in a shared container in state 1708. The participant or the owner could close the container, moving to state closed 1706. In closed state 1706, either the owner or participant can reopen the container, returning to shared state 1708. The owner can delete the container from shared state 1708, moving to deleted state 1704. From shared state 1708, there could also be a change of participants in state 1710, which could consist of any of the owner or participant adding or deleting a participant, or the participant leaving. If any change in participants results in the owner being the only remaining participant, the process returns to state private container 1702.

Figure 18A:
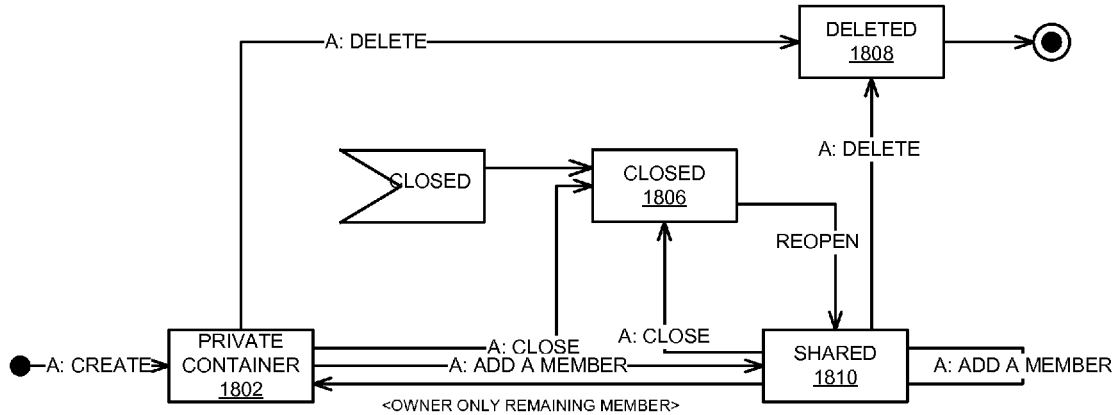
FIGS. 18A-18B are block diagrams of an embodiment of a state flow for sharing a container.
Figure 18B:
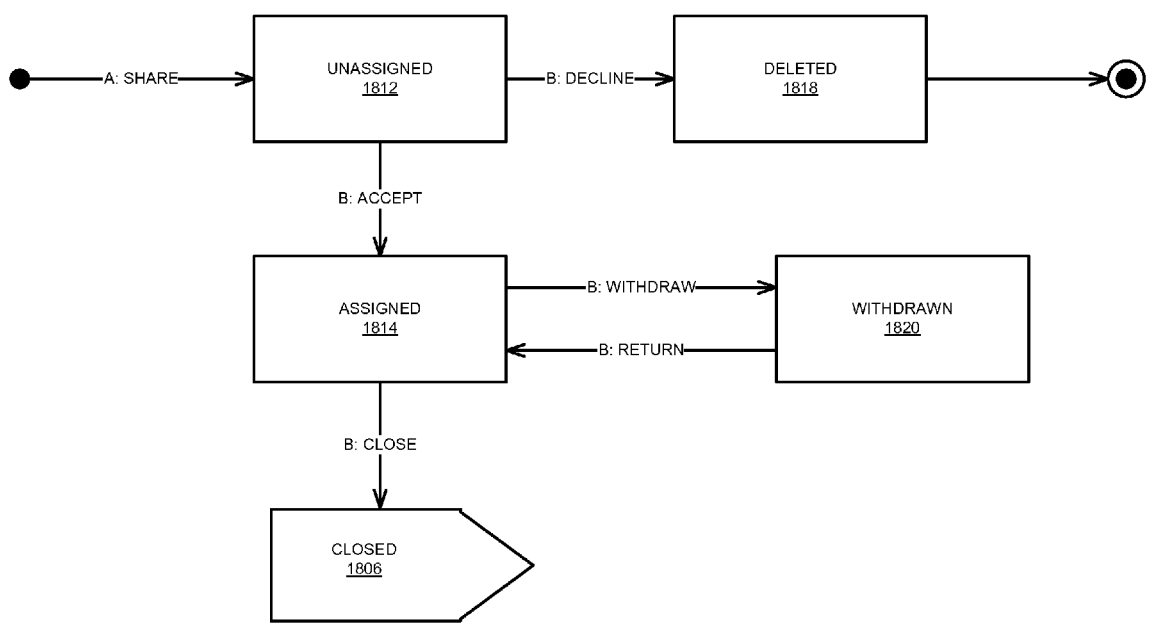

FIGS. 18A-18B are block diagrams of an embodiment of a state flow for sharing a container. For purposes of the state machine, there are considered to be two entities, A (the owner) and B (the member). FIG. 18A represents the state of a container, where the owner creates the container or has the container created for the owner, resulting in a private container state 1802. The owner can delete the container, resulting in deleted state 1808. The owner can close the container, resulting in closed state 1806. The owner could add a member, moving to shared state 1810. From shared state 1810, the owner could close the container, moving to closed state 1806, or delete the container, moving to deleted state 1808. From closed state 1806, the owner or the system can reopen the container, moving the container back to the shared state 1810. From shared state 1810, the owner could add members, or could remove members. If all members are removed resulting in the owner being the only remaining member, the state moves to private container state 1802.

In FIG. 18B, the states associated with one connection for sharing a container are shown. The container is shared, resulting in an unassigned state 1812. If the sharing is declined by the member, the state moves to deleted 1818, which terminates the member's connection. If the member accepts, the state moves to assigned state 1814. From assigned state 1814, the connection can be closed by the member, moving to closed state 1806 of FIG. 18A. The member could also withdraw, moving the state to withdrawn state 1820. The member can return from withdrawn state 1820 to assigned state 1814.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer implemented method comprising:
providing in a server a collaboration container having persistence of content of the container including runtime input to the container, the container uniquely associated with a user owner, the container having an activity uniquely associated with the container, the activity representing a collection of resources including services and documents for one or more users to interact with to perform an objective, one or more resources associated with different data types, and the container allows for collaborative work between a requester and a receiver;
representing the resources associated with different data types as uniform content items within the container, each content item being a proxy for an original content resource and pointing to the original content in the server, the representing including presenting each resource as an instance of a first container item class within the container, the first container item class having common interfaces applicable to each instance for uniform data input, data access, and display rendering of the content items within the container, where interaction through the common interfaces transforms the content of the container and is applied to the original content via content adapters, where the content items are the collection of resources and are persisted as the content of the container; and,
exposing the content items in the container as a user interface with tools that receive content items and user-generated content as inputs to operate on the content items at a runtime of the container, including accessing and modifying the data content pointed to by the content items at runtime in response to user interaction with the content items in the container, to perform the objective of the activity.

2. The method of claim 1, wherein providing the container further comprises:
provisioning the activity for a work situation within the container, the container associated with:
a defined set of states for the activity,
a visualization for recording state of the activity, and
a context including a persisted state.

3. The method of claim 1, wherein the activity is associated with a phase of a business process, where the business process includes parameters identifying resources to perform the business process, and defining deliverables.

4. The method of claim 3, further comprising:
modifying a current state of the business process in the backend server based on user interaction with the container.

5. The method of claim 1, wherein the activity includes one or more sub-activities, each sub-activity being an atomic unit of work as represented by a modeled object generated in a backend enterprise system.

6. The method of claim 1, wherein the original content in the server comprises content in an enterprise resource planning system, a customer relationship management system, a business intelligence system, a document repository, a search service, or a transactional system, of an enterprise system.

7. The method of claim 1, wherein providing the container further comprises:
instantiating a container instance having access to data and services needed to perform actions to accomplish the activity, including associating one or more of a document, a web service, or a data object as one or more content items with the instantiated container instance to cause the content items to be managed within the container instance.

8. The method of claim 7, wherein instantiating the workspace container instance having access to data and services needed to perform the actions further comprises:
binding one or more container resources to one or more web services hosted in the backend server.

9. The method of claim 1, wherein representing content items further comprises:
receiving a content item as data modeled in multiple dimensions; and,
representing a specific rendering of the data of the content item from one dimension, while allowing the data to be runtime rendered within the container from another dimension.

10. The method of claim 1, wherein representing the content items comprises:
abstractly representing a content item with a specific rendering of the data of the content item, while allowing the data to be runtime manipulated; and,
dynamically re-rendering a representation of the content item at runtime to show a different rendering of the content item, based on the manipulation of the content item by user interaction.

11. The method of claim 1, further comprising:
adding additional content to the container by receiving a content item as input to the container, and persisting the content item as a context of the activity within the container.

12. The method of claim 11, wherein adding additional content comprises:
adding user generated content including one or more of comments, tags, votes, views to data, or associations of an external content item with the activity.

13. The method of claim 11, further comprising:
associating an additional activity with the container; and
augmenting the content of the container with additional information associated with the additional activity.

14. The method of claim 1, further comprising:
designating one of the content items as a principal action item of the container, where rendering of the content items within a user interface generated to display the activity is dynamically adjusted based on the designation of the principal action item.

15. The method of claim 14, further comprising:
dynamically changing designation of the principal action item of the activity based on user interaction with the content items, and dynamically updating the rendering displayed corresponding to the changing designation.

16. The method of claim 1, further comprising:
associating the container with one or more additional containers as a collection of containers, including integrating content from the additional containers related to the activity.

17. The method of claim 1, wherein the container is associated with a single original user, and further comprising:
adding an additional user to the container by generating a request to the additional user in response to an action by the original user, and providing access to the additional user to the workspace container in response to an acceptance by the additional user, where the original user is a requester, and the additional user is a receiver.

18. The method of claim 1, wherein exposing the content items further comprises:
exposing the content items to a defined group of users;
modifying runtime permissions of the container at runtime to add an additional user to the defined group to provide access to the additional user to the container.

19. The method of claim 18, further comprising:
exchanging messages between the group of users, wherein a representative message includes as content: task assignment, or associations of the defined states in the activity.

20. A computer-implemented method comprising:
generating, in a server, a reference to an activity in response to a request from a requester frontend device, the activity representing a collection of resources including services and documents for one or more users to interact with to perform an objective, one or more resources associated with different data types;
passing the activity reference to a receiver frontend device as a work package, the work package representing a request by the requester for the receiver to accomplish the activity;
instantiating a workspace container instance in the server in response to an acceptance of the request, each content item being a proxy for an original content resource and pointing to the original content in the server, including associating resources and access to data and services to the container needed to perform the objective of the activity, where the resources associated with different data types are represented as uniform content items within the workspace container, including presenting each resource as an instance of a first container item class within the container, the first container item class having common interfaces applicable to each instance for uniform data input, data access, and display rendering of the content items within the container, where interaction through the common interfaces is applied to the original content via content adapters, accessing and modifying the data content pointed to by the content items at runtime in response to user interaction with the content items in the container; and,
generating a workspace context in the server uniquely associated with the workspace container, the workspace context incorporating content items of the container and user-generated content and transformation of the content items, where the workspace context is persisted in the server.

21. The method of claim 20, wherein instantiating the workspace container instance comprises:
instantiating the workspace container instance in conjunction with the receiver becoming the requester and requesting a different receiver to accomplish the activity, where the workspace container is only accessible to the receiver who becomes the requester and the different receiver.

22. The method of claim 20, wherein the requester is an original requester and the receiver is an original receiver, and wherein instantiating the workspace container instance and generating the workspace context comprise:
  instantiating a first workspace container instance and generating a first workspace context with only the original requester and the original receiver having access to the first workspace context to interact with each other to accomplish the activity; and,
  further comprising:
  instantiating a second workspace container instance, where the original receiver becomes a secondary requester and requests a secondary receiver to perform at least a portion of the activity, and generating a second workspace with only the secondary requester and the secondary receiver having access to the second workspace context to interact with each other to accomplish the portion of the activity.

23. An article of manufacture comprising a non-transitory computer readable storage medium having content stored thereon, which when executed causes a computing device to perform operations including:
  providing in a server a collaboration container having persistence of content of the container including runtime input to the container, the container uniquely associated with a user owner, the container having an activity uniquely associated with the container, the activity representing a collection of resources including services and documents for one or more users to interact with to perform an objective, one or more resources associated with different data types, and the container allows for collaborative work between a requester and a receiver;
  representing the resources associated with different data types as uniform content items within the container, each content item being a proxy for an original content resource and pointing to the original content in the server, the representing including presenting each resource as an instance of a first container item class within the container, the first container item class having common interfaces applicable to each instance for uniform data input, data access, and display rendering of the content items within the container, where interaction through the common interfaces transforms the content of the container and is applied to the original content via content adapters, where the content items are the collection of resources and are persisted as the content of the container; and,
  exposing the content items in the container as a user interface with tools that receive content items and user-generated content as inputs to operate on the content items at a runtime of the container, including accessing and modifying the data content pointed to by the content items at runtime in response to user interaction with the content items in the container, to perform the objective of the activity.

* * * * *